(12) United States Patent
Shih et al.

(10) Patent No.: US 9,356,320 B2
(45) Date of Patent: May 31, 2016

(54) LITHIUM BATTERY HAVING LOW LEAKAGE ANODE

(71) Applicants: Tung-Hsiu Shih, Cerrito, CA (US); Kai Wei Nieh, Monrovia, CA (US); Victor Krasnov, Tarzana, CA (US); Jiuh-Ming Liang, Hacienda Heights, CA (US)

(72) Inventors: Tung-Hsiu Shih, Cerrito, CA (US); Kai Wei Nieh, Monrovia, CA (US); Victor Krasnov, Tarzana, CA (US); Jiuh-Ming Liang, Hacienda Heights, CA (US)

(73) Assignee: FRONT EDGE TECHNOLOGY INC., Baldwin City, CA (US)

( * ) Notice: Subject to any disclaimer, the term of this patent is extended or adjusted under 35 U.S.C. 154(b) by 738 days.

(21) Appl. No.: 13/652,416

(22) Filed: Oct. 15, 2012

(65) Prior Publication Data

US 2014/0106203 A1   Apr. 17, 2014

(51) Int. Cl.
*H01M 10/058* (2010.01)
*H01M 10/0585* (2010.01)
*H01M 10/04* (2006.01)
*H01M 4/04* (2006.01)
*H01M 4/13* (2010.01)
*H01M 4/139* (2010.01)
*H01M 10/052* (2010.01)
*H01M 10/42* (2006.01)

(52) U.S. Cl.
CPC .......... *H01M 10/058* (2013.01); *H01M 4/0407* (2013.01); *H01M 4/0426* (2013.01); *H01M 4/13* (2013.01); *H01M 4/139* (2013.01); *H01M 10/0436* (2013.01); *H01M 10/052* (2013.01); *H01M 10/0585* (2013.01); *H01M 2010/4292* (2013.01); *Y02E 60/122* (2013.01); *Y02P 70/54* (2015.11)

(58) Field of Classification Search
None
See application file for complete search history.

(56) References Cited

U.S. PATENT DOCUMENTS

| 3,375,135 A | 3/1968 | Moulton et al. |
| 3,414,685 A | 12/1968 | Geib et al. |
| 3,530,007 A | 9/1970 | Golubovic |
| 3,844,841 A | 10/1974 | Baker |
| 3,969,142 A | 7/1976 | Greatbatch et al. |

(Continued)

FOREIGN PATENT DOCUMENTS

| CN | 1661354 A | 8/2005 |
| EP | 0 829 913 A | 3/1998 |

(Continued)

OTHER PUBLICATIONS

Antaya et al. "Preparation and Characterization of LiCoO2 Thin Films by Laser Ablation Deposition", J. Electrochem. Soc., vol. 140, No. 3, Mar. 1993, pp. 575-578.

(Continued)

*Primary Examiner* — Jonathan Crepeau
(74) *Attorney, Agent, or Firm* — Ashok K. Janah; Janah & Associates, PC

(57) ABSTRACT

A lithium battery comprises a support, and a plurality of battery component layers on the support, the battery component layers including a cathode having a cathode area with a plurality of cathode perimeter edges. An electrolyte is on the cathode, and an anode is on the electrolyte. The anode comprises an anode area with a plurality of anode perimeter edges, each anode perimeter edge having a corresponding cathode perimeter edge that lies adjacent to and below the anode perimeter edge. The anode area is sized so that at least one anode perimeter edge is terminated before its corresponding cathode perimeter edge to define a gap between the anode perimeter edge and the corresponding cathode perimeter edge, the gap having a gap distance G.

18 Claims, 8 Drawing Sheets

(56) References Cited

U.S. PATENT DOCUMENTS

| | | |
|---|---|---|
| 3,993,508 A | 11/1976 | Erlichman |
| 4,031,449 A | 6/1977 | Trombly |
| 4,119,769 A | 10/1978 | Schneider et al. |
| 4,233,371 A | 11/1980 | Dorrestijn |
| 4,309,494 A | 1/1982 | Stockel |
| 4,421,835 A | 12/1983 | Manassen et al. |
| 4,459,328 A | 7/1984 | Mizuhara |
| 4,543,441 A | 9/1985 | Kumada et al. |
| 4,565,753 A | 1/1986 | Goebel et al. |
| 4,597,844 A | 7/1986 | Hiraki et al. |
| 4,619,865 A | 10/1986 | Keem et al. |
| 4,663,183 A | 5/1987 | Ovshinsky et al. |
| 4,698,256 A | 10/1987 | Giglia et al. |
| 4,714,660 A | 12/1987 | Gates, Jr. |
| 4,725,345 A | 2/1988 | Sakamoto et al. |
| 4,777,090 A | 10/1988 | Ovshinsky et al. |
| 4,871,433 A | 10/1989 | Wagner et al. |
| 4,873,115 A | 10/1989 | Matsumura et al. |
| 4,877,677 A | 10/1989 | Hirochi et al. |
| 4,882,212 A | 11/1989 | SingDeo et al. |
| 4,904,542 A | 2/1990 | Mroczkowski |
| 4,996,079 A | 2/1991 | Itoh |
| 5,019,467 A | 5/1991 | Fujiwara |
| 5,171,413 A | 12/1992 | Arntz et al. |
| 5,197,889 A | 3/1993 | Rizzo et al. |
| 5,240,794 A | 8/1993 | Thackeray et al. |
| 5,249,554 A | 10/1993 | Tamor et al. |
| 5,250,891 A | 10/1993 | Glasgow |
| 5,253,300 A | 10/1993 | Knapp |
| 5,254,415 A | 10/1993 | Williams et al. |
| 5,262,028 A | 11/1993 | Manley |
| 5,330,853 A | 7/1994 | Hofmann et al. |
| 5,338,625 A | 8/1994 | Bates et al. |
| 5,368,939 A | 11/1994 | Kawamura et al. |
| 5,445,906 A | 8/1995 | Hobson et al. |
| 5,490,911 A | 2/1996 | Makowiecki et al. |
| 5,498,490 A | 3/1996 | Brodd |
| 5,503,912 A | 4/1996 | Setoyama et al. |
| 5,506,858 A | 4/1996 | Takenaka et al. |
| 5,511,587 A | 4/1996 | Miya et al. |
| 5,512,147 A | 4/1996 | Bates et al. |
| 5,512,387 A | 4/1996 | Ovshinsky |
| 5,516,340 A | 5/1996 | Takeuchi et al. |
| 5,547,767 A | 8/1996 | Paidassi et al. |
| 5,552,242 A | 9/1996 | Ovshinsky et al. |
| 5,554,456 A | 9/1996 | Ovshinsky et al. |
| 5,561,004 A | 10/1996 | Bates et al. |
| 5,597,660 A | 1/1997 | Bates et al. |
| 5,607,789 A | 3/1997 | Treger et al. |
| 5,612,152 A | 3/1997 | Bates et al. |
| 5,629,560 A | 5/1997 | Katsui et al. |
| 5,650,243 A | 7/1997 | Ferment et al. |
| 5,656,364 A | 8/1997 | Rickerby et al. |
| 5,663,183 A | 9/1997 | Frost et al. |
| 5,670,252 A | 9/1997 | Makowiecki et al. |
| 5,670,272 A | 9/1997 | Cheu et al. |
| 5,681,666 A | 10/1997 | Treger et al. |
| 5,700,551 A | 12/1997 | Kukino et al. |
| 5,705,293 A | 1/1998 | Hobson |
| 5,705,297 A | 1/1998 | Warren |
| 5,708,297 A | 1/1998 | Clayton |
| 5,725,909 A | 3/1998 | Shaw et al. |
| 5,786,582 A | 7/1998 | Roustaei et al. |
| 5,814,159 A | 9/1998 | Paley et al. |
| 5,818,199 A | 10/1998 | Beard |
| 5,824,374 A | 10/1998 | Bradley, Jr. et al. |
| 5,871,865 A | 2/1999 | Barker et al. |
| 5,894,656 A | 4/1999 | Menon et al. |
| 5,932,368 A | 8/1999 | Batawi et al. |
| 5,961,672 A | 10/1999 | Skotheim et al. |
| 5,981,102 A | 11/1999 | Grigg et al. |
| 5,985,485 A | 11/1999 | Ovshinsky et al. |
| 6,017,654 A | 1/2000 | Kumta et al. |
| 6,022,640 A | 2/2000 | Takada et al. |
| 6,039,850 A | 3/2000 | Schulz |
| 6,040,680 A | 3/2000 | Toya et al. |
| 6,046,575 A | 4/2000 | Demuro |
| 6,051,114 A | 4/2000 | Yao et al. |
| 6,118,248 A | 9/2000 | Gartstein et al. |
| 6,146,715 A | 11/2000 | Kim et al. |
| 6,148,503 A | 11/2000 | Delnick et al. |
| 6,168,884 B1 | 1/2001 | Neudecker et al. |
| 6,197,450 B1 | 3/2001 | Nathan et al. |
| 6,217,623 B1 | 4/2001 | Reichert et al. |
| 6,218,049 B1 | 4/2001 | Bates et al. |
| 6,220,765 B1 | 4/2001 | Tatoh |
| 6,227,204 B1 | 5/2001 | Baumann et al. |
| 6,238,847 B1 | 5/2001 | Axtell, III et al. |
| 6,242,129 B1 | 6/2001 | Johnson |
| 6,264,709 B1 | 7/2001 | Yoon et al. |
| 6,280,875 B1 | 8/2001 | Kwak et al. |
| 6,287,711 B1 | 9/2001 | Nieh et al. |
| 6,340,880 B1 | 1/2002 | Higashijima et al. |
| 6,365,010 B1 | 4/2002 | Hollars |
| 6,379,835 B1 | 4/2002 | Kucherovsky et al. |
| 6,387,039 B1 | 5/2002 | Moses |
| 6,387,563 B1 | 5/2002 | Bates |
| 6,398,824 B1 | 6/2002 | Johnson |
| 6,402,796 B1 | 6/2002 | Johnson |
| 6,411,780 B1 | 6/2002 | Maruyama |
| 6,413,645 B1 | 7/2002 | Graff et al. |
| 6,461,757 B1 | 10/2002 | Sasayama et al. |
| 6,472,295 B1 | 10/2002 | Morris et al. |
| 6,517,968 B2 | 2/2003 | Johnson |
| 6,558,836 B1 | 5/2003 | Whitacre et al. |
| 6,632,563 B1 | 10/2003 | Krasnov et al. |
| 6,636,017 B2 | 10/2003 | Zink et al. |
| 6,645,658 B2 | 11/2003 | Morozumi |
| 6,658,124 B1 | 12/2003 | Meadows |
| 6,661,197 B2 | 12/2003 | Zink et al. |
| 6,696,199 B2 | 2/2004 | Yoshida et al. |
| 6,700,766 B2 | 3/2004 | Sato |
| 6,713,987 B2 | 3/2004 | Krasnov et al. |
| 6,805,998 B2 | 10/2004 | Jenson et al. |
| 6,863,699 B1 | 3/2005 | Krasnov et al. |
| 6,866,901 B2 | 3/2005 | Burrows et al. |
| 6,916,679 B2 | 7/2005 | Snyder et al. |
| 6,921,464 B2 | 7/2005 | Krasnov et al. |
| 6,940,988 B1 | 9/2005 | Shennib et al. |
| 6,982,132 B1 | 1/2006 | Goldner et al. |
| 7,037,621 B2 | 5/2006 | Kikuchi et al. |
| 7,056,620 B2 | 6/2006 | Krasnov et al. |
| 7,122,908 B2 | 10/2006 | Jiang et al. |
| 7,157,187 B2 | 1/2007 | Jenson |
| 7,186,479 B2 | 3/2007 | Krasnov et al. |
| 7,194,801 B2 | 3/2007 | Jenson et al. |
| 7,194,901 B2 | 3/2007 | Silverbrook et al. |
| 7,204,862 B1 | 4/2007 | Zhang |
| 7,276,878 B2 | 10/2007 | Phillips et al. |
| 7,308,316 B2 | 12/2007 | Schommer |
| 7,359,590 B2 | 4/2008 | Hsu |
| 7,397,118 B2 | 7/2008 | Tominaga |
| 7,510,582 B2 | 3/2009 | Krasnov et al. |
| 7,524,577 B2 | 4/2009 | Bates |
| 7,701,176 B2 | 4/2010 | Chen |
| 7,846,579 B2 | 12/2010 | Krasnov et al. |
| 7,862,627 B2 | 1/2011 | Li et al. |
| 7,862,927 B2 | 1/2011 | Krasnov et al. |
| 8,030,898 B2 | 10/2011 | Okuto |
| 8,168,322 B2 | 5/2012 | Krasnov et al. |
| 8,475,955 B2 | 7/2013 | Krasnov et al. |
| 8,502,494 B2 | 8/2013 | Nieh et al. |
| 8,628,645 B2 | 1/2014 | Wang et al. |
| 8,679,674 B2 | 3/2014 | Krasnov et al. |
| 8,728,176 B2 | 5/2014 | Li et al. |
| 8,753,724 B2 | 6/2014 | Nieh et al. |
| 8,864,954 B2 | 10/2014 | Liang et al. |
| 8,865,340 B2 | 10/2014 | Liang et al. |
| 8,870,974 B2 | 10/2014 | Nieh et al. |
| 2001/0007335 A1 | 7/2001 | Tuttle et al. |
| 2001/0041294 A1 | 11/2001 | Chu et al. |
| 2001/0052645 A1 | 12/2001 | Op'T Eynde et al. |
| 2002/0004167 A1 | 1/2002 | Jenson et al. |
| 2002/0028384 A1 | 3/2002 | Krasnov et al. |

(56) References Cited

U.S. PATENT DOCUMENTS

| | | |
|---|---|---|
| 2002/0041930 A1 | 4/2002 | Erdemir et al. |
| 2002/0071989 A1 | 6/2002 | Verma et al. |
| 2002/0100989 A1 | 8/2002 | Jiang et al. |
| 2002/0102400 A1 | 8/2002 | Gorokhovsky et al. |
| 2002/0110733 A1 | 8/2002 | Johnson |
| 2002/0156823 A1 | 10/2002 | Weng et al. |
| 2003/0121142 A1 | 7/2003 | Kikuchi et al. |
| 2003/0143460 A1 | 7/2003 | Yoshida et al. |
| 2003/0152829 A1 | 8/2003 | Zhang et al. |
| 2003/0160589 A1 | 8/2003 | Krasnov et al. |
| 2004/0018424 A1 | 1/2004 | Zhang et al. |
| 2004/0064937 A1 | 4/2004 | Krasnov et al. |
| 2004/0086762 A1 | 5/2004 | Maeda et al. |
| 2004/0175609 A1 | 9/2004 | Yageta et al. |
| 2005/0079418 A1 | 4/2005 | Kelley et al. |
| 2005/0112461 A1 | 5/2005 | Amine et al. |
| 2005/0130032 A1 | 6/2005 | Krasnov et al. |
| 2005/0147877 A1 | 7/2005 | Tarnowski et al. |
| 2005/0156573 A1 | 7/2005 | Lin |
| 2005/0186468 A1* | 8/2005 | Kosuda et al. ............ 429/130 |
| 2005/0275370 A1 | 12/2005 | Kim |
| 2006/0027937 A1 | 2/2006 | Benson et al. |
| 2006/0040169 A1 | 2/2006 | Liu et al. |
| 2006/0040170 A1 | 2/2006 | Liu et al. |
| 2006/0060956 A1 | 3/2006 | Tanikella |
| 2006/0068258 A1 | 3/2006 | Kinoshita |
| 2006/0115706 A1 | 6/2006 | Maeda et al. |
| 2006/0134522 A1 | 6/2006 | Zhang et al. |
| 2006/0152196 A1 | 7/2006 | Matsumoto et al. |
| 2006/0216589 A1 | 9/2006 | Krasnov et al. |
| 2006/0226812 A1 | 10/2006 | Patino et al. |
| 2006/0267546 A1 | 11/2006 | Shen et al. |
| 2007/0000688 A1 | 1/2007 | Mobley |
| 2007/0037054 A1 | 2/2007 | Kikuchi et al. |
| 2007/0047750 A1 | 3/2007 | Sauer et al. |
| 2007/0104343 A1 | 5/2007 | Bengtsson et al. |
| 2007/0104344 A1 | 5/2007 | Goldberg |
| 2007/0141460 A1 | 6/2007 | You et al. |
| 2007/0166612 A1 | 7/2007 | Krasnov et al. |
| 2007/0172739 A1 | 7/2007 | Visco et al. |
| 2007/0200258 A1 | 8/2007 | Mahler et al. |
| 2007/0297108 A1 | 12/2007 | Collins et al. |
| 2008/0003492 A1 | 1/2008 | Bates |
| 2008/0087986 A1 | 4/2008 | Tanikella |
| 2008/0191342 A1 | 8/2008 | Otremba |
| 2008/0213664 A1 | 9/2008 | Krasnov et al. |
| 2008/0217162 A1 | 9/2008 | Delrue et al. |
| 2008/0253098 A1 | 10/2008 | Liu |
| 2008/0263855 A1 | 10/2008 | Li et al. |
| 2008/0290363 A1 | 11/2008 | Lin et al. |
| 2008/0303056 A1 | 12/2008 | Ward et al. |
| 2008/0308935 A1 | 12/2008 | Kim et al. |
| 2009/0010462 A1 | 1/2009 | Ekchian et al. |
| 2009/0029500 A1 | 1/2009 | Wan |
| 2009/0039498 A1 | 2/2009 | Bayerer |
| 2009/0057136 A1 | 3/2009 | Wang et al. |
| 2009/0114429 A1 | 5/2009 | Sri-Jayantha et al. |
| 2009/0115051 A1 | 5/2009 | Leung et al. |
| 2009/0136833 A1 | 5/2009 | Kraznov et al. |
| 2009/0208671 A1 | 8/2009 | Nieh et al. |
| 2009/0214899 A1 | 8/2009 | Shakespeare et al. |
| 2010/0028775 A1* | 2/2010 | Emura et al. ............ 429/209 |
| 2010/0247987 A1 | 9/2010 | Holung et al. |
| 2010/0291431 A1 | 11/2010 | Shih et al. |
| 2011/0050159 A1 | 3/2011 | Nieh et al. |
| 2011/0076550 A1 | 3/2011 | Liang et al. |
| 2011/0094094 A1 | 4/2011 | Li et al. |
| 2011/0270477 A1 | 11/2011 | Ueki |
| 2012/0003520 A1 | 1/2012 | Lee et al. |
| 2012/0034502 A1 | 2/2012 | Nieh et al. |
| 2012/0080940 A1 | 4/2012 | Larsen |
| 2012/0251867 A1 | 10/2012 | Krasnov et al. |
| 2012/0268057 A1 | 10/2012 | Wu |
| 2013/0164607 A1 | 6/2013 | Shih |
| 2013/0260230 A1 | 10/2013 | Liang |
| 2014/0087227 A1 | 3/2014 | Shih |
| 2014/0106203 A1 | 4/2014 | Shih |
| 2014/0106216 A1 | 4/2014 | Liang |
| 2014/0166471 A1 | 6/2014 | Wang et al. |
| 2014/0291144 A1 | 10/2014 | Nieh et al. |
| 2015/0010717 A1 | 1/2015 | Nieh et al. |

FOREIGN PATENT DOCUMENTS

| | | |
|---|---|---|
| EP | 1 353 429 A | 10/2003 |
| EP | 1 458 037 A | 9/2004 |
| FR | 2 403 652 A | 4/1979 |
| GB | 2251119 | 6/1992 |
| JP | 59-032023 A | 2/1984 |
| JP | 59-226472 A | 12/1984 |
| JP | 60-072168 | 4/1985 |
| JP | 61195563 A | 8/1986 |
| JP | 04-295015 | 10/1992 |
| JP | 09-259929 A | 10/1997 |
| JP | 2001-044073 A | 2/2001 |
| JP | 2001-273892 * | 10/2001 |
| JP | 2002-165358 | 6/2002 |
| JP | 2002-313289 | 10/2002 |
| JP | 2003-249199 A | 9/2003 |
| WO | WO-95/14311 A | 5/1995 |
| WO | WO-98/08672 A1 | 3/1998 |
| WO | WO-99/23714 | 5/1999 |
| WO | WO-99/52589 A1 | 10/1999 |
| WO | WO-00/60689 A | 10/2000 |
| WO | WO-01/73873 A | 10/2001 |
| WO | WO-02/061828 A2 | 8/2002 |
| WO | WO-02/021627 A3 | 1/2003 |
| WO | WO-02/042516 A3 | 1/2003 |
| WO | WO-03/061049 | 7/2003 |
| WO | WO-03/061049 A | 7/2003 |
| WO | WO-03/073531 A3 | 12/2003 |
| WO | WO-03/005477 A3 | 12/2004 |
| WO | WO-2004/111659 A2 | 12/2004 |
| WO | WO-2006/042357 A1 | 4/2006 |
| WO | WO-2006/105188 A1 | 10/2006 |
| WO | WO-2006/105050 A3 | 3/2007 |
| WO | WO-2007/042394 | 4/2007 |
| WO | WO-2008/004851 A1 | 1/2008 |
| WO | WO-2008/108999 A3 | 11/2008 |
| WO | WO-2008/134053 A1 | 11/2008 |
| WO | WO-2009/052683 A1 | 4/2009 |
| WO | WO-2009/073150 | 6/2009 |

OTHER PUBLICATIONS

Fragnaud et al. "Characterization of sprayed and sputter deposited LiCoO2 thin films for rechargeable microbatteries", J. Power Sources, 63 (1996), pp. 187-191.

Birke et al. "Materials for lithium thin-film batteries for application in silicon technology", Solid State Ionics, 93 (1997), pp. 1-15.

Benqlilou-Moudden et al. "Amorphous Lithium Cobalt and Nickel Oxides Thin Films Preparation and Characterization by RBS and PIGE", Thin Solid Films 333 (1998), pp. 16-19.

Yang et al., "Effect of annealing temperature on structure and electrochemical properties of LiCoO2 cathode thin films", Rare Metals, vol. 25, Dec. 2006, pp. 189-192.

PCT International Search Report in Application no. PCT/US2008/013213 (WO 2009/073150 A1), mailed Jun. 18, 2009.

Mattox, Donald M., Handbook of Physical Vapor Deposition (PVD) Processing, Film Formation, Adhesion, Surface Preparation and Contamination Control, 1998, pp. 127-135 and 343-364, Noyes Publications, Westwood, New Jersey, USA.

Roh et al., "Effects of deposition condition on the ionic conductivity . . . " Scripta Materialia, Dec. 17, 1999, pp. 43-49, vol. 42. No. 1, New York, NY.

Bolster et al., "Investigation of lithium intercalation metal oxides for thermalbatteries" Proceedings of the 34th Int'l Power Source Symposium, Jun. 25-28, 1990, pp. 136-140.

Liang, Jiuh-Ming, U.S. Appl. No. 13/434,775, filed Mar. 29, 2012, for Localized Heat Treatment of Battery Component Films.

Nieh et al., U.S. Appl. No. 13/627,977, filed Sep. 26, 2012, for Plasma Deposition on a Partially Formed Battery Through a Mesh Screen.

(56) References Cited

OTHER PUBLICATIONS

Shih et al., U.S. Appl. No. 13/626,842, filed Sep. 25, 2012, for Solid State Battery Having Mismatched Cells.
Shih et al., U.S. Appl. No. 13/333,969, filed Dec. 21, 2011, for Laminated Lithium Battery.
Nieh et al., U.S. Appl. No. 13/337,031, filed Dec. 23, 2011, for Sputtering Lithium-Containing Material With Multiple Targets.
Liang et al., U.S. Appl. No. 13/278,082, filed Oct. 20, 2011, for Thin Film Battery Packaging Formed by Localized Heating.
PCT International Search Report in Application No. PCT/US2011/046674 dated Feb. 17, 2012.
Bates et al., "Preferred orientation of polycrystalline LiCoO2 films" J. of the Electrochemical Society (2000), pp. 59-70, Issue No. 147 (1).
Wagner et al., "Fabrication and Testing of thermoelectric thin film devices" 15th Int'l Conf. on Thermoelectrics, Mar. 26-29, 1996, pp. 269-273.
Neudecker et al., "Lithium-Free Thin-Film Battery . . . " Journal of the Electrochemical Society (2000), pp. 517-523, Issue No. 147 (2).
Park et al., "Characterization of tin oxide/LiMn2O4 thin-film cell," Journal of Power Sources, Jun. 2000, pp. 250-254, vol. 88, No. 2, Elsevier Science S.A.
PCT International Preliminary Report on Patentability, Application No. PCT/US2008/013213 (WO09/073150), Mailed Jun. 10, 2010.
PCT/US2013/059628 PCT International Search Report, Mailed on Dec. 10, 2013.
PCT/US2013/059628 PCT International Preliminary Report on Patentability, Mailed on Apr. 21, 2015.

* cited by examiner

LITHIUM BATTERY HAVING LOW LEAKAGE ANODE

BACKGROUND

Embodiments of the present invention relate to lithium batteries and their structure, packaging and fabrication methods.

Lithium batteries are used in applications that require a small battery with a high energy density such as, for example, portable electronics, medical devices and space systems. A typical lithium battery comprises a support to hold one or more battery cells, each cell having a set of battery component layers that include an electrolyte comprising a lithium-containing material sandwiched between electrode layers, such as an anode, cathode, and/or current collectors. The battery component layers cooperate to store electrical charge and generate a voltage. Lithium batteries include larger scale structures, used for computer and car batteries, and thin film batteries in which the battery component layers are thin films which have thicknesses of less than 100 microns. Lithium batteries can also either be used individually or multiple batteries can be stacked together to provide more power or more energy.

Lithium battery structures and layouts that increase the energy density and specific energy of the battery are continually being developed. The energy density is the fully charged output energy per unit volume while the specific energy is the fully charged output energy per unit weight of the battery. In one example, higher energy densities and specific energies were achieved from thicker cathode layers, for example, cathodes having thicknesses of 5 microns or higher, which were deposited in a multi-step deposition and annealing processes, as described in commonly assigned U.S. Pat. No. 7,862,927, filed on Mar. 2, 2007, entitled "THIN FILM BATTERY AND MANUFACTURING METHOD", to Krasnov et al. which is incorporated by reference herein and in its entirety. The thicker cathode films provided greater charge retention and faster charging and discharging rates even when the thickness of the other battery component layers were held constant.

However, while thicker cathode layers increase the energy retention levels of a battery, the thicker cathodes can generate other structural problems. For example, a thicker cathode can delaminate more easily during charge and discharge cycles because of variations in stress levels across the flat dimension of the cathode that result from varying lithium ion concentrations. The thicker cathode can also create fabrication and layout problems for the other battery component layers.

For these and other reasons, further developments and improvements in lithium battery structures, packaging and fabrication methods, which can provide high energy density and specific energy levels are continuously being sought.

SUMMARY

A lithium battery comprises a support, and a plurality of battery component layers on the support, the battery component layers including a cathode having a cathode area with a plurality of cathode perimeter edges. An electrolyte is on the cathode, and an anode is on the electrolyte. The anode comprises an anode area with a plurality of anode perimeter edges, each anode perimeter edge having a corresponding cathode perimeter edge that lies adjacent to and below the anode perimeter edge. The anode area is sized so that at least one anode perimeter edge is terminated before its corresponding cathode perimeter edge to define a gap between the anode perimeter edge and the corresponding cathode perimeter edge, the gap having a gap distance G.

A lithium battery manufacturing method comprising forming a plurality of battery component layers on a support, the battery component layers including a cathode having a cathode area with a plurality of cathode perimeter edges, and an electrolyte on the cathode. An anode is formed on the electrolyte by fabricating a mask having mask perimeter edges that are capable of defining an anode area having a plurality of anode perimeter edges each of which have a corresponding cathode perimeter edge that lies adjacent to and immediately below the anode perimeter edge. The mask is sized so that at least one mask perimeter edge is positioned to generate an anode perimeter edge that terminates before its corresponding cathode perimeter edge to provide a gap between the anode perimeter edge and the corresponding cathode perimeter edge, the gap having a gap distance G. The mask is placed between the support and a sputtering target comprising anode material. The sputtering target is sputtered through the mask to form an anode having the anode perimeter edges on the electrolyte.

A lithium battery comprises a support having a plurality of battery component layers on the support. The battery component layers include a cathode and an overlying electrolyte, the electrolyte having a plurality of electrolyte perimeter edges. An anode is on the electrolyte, the anode having a plurality of anode perimeter edges that include a first anode perimeter edge that terminates before a corresponding first electrolyte perimeter edge that is adjacent to the first anode perimeter edge. An over-edge anode dielectric covers and is directly on the first anode perimeter edge.

A lithium battery comprising a support having a plurality of battery component layers on the support, the battery component layers including a cathode and an overlying electrolyte, the electrolyte having a plurality of electrolyte perimeter edges. an under-edge anode dielectric covering an electrolyte perimeter edge lying over a corresponding cathode perimeter edge. An anode at least partially covers the cathode.

A lithium battery comprising a support having a plurality of battery component layers on the support, the battery component layers including a cathode and an overlying electrolyte, the cathode having a plurality of cathode perimeter edges. An under-edge anode dielectric covers at least one cathode perimeter edge. An electrolyte covers the cathode, and at least partially covers the under-edge anode dielectric. An anode covers the electrolyte.

DRAWINGS

These features, aspects, and advantages of the present invention will become better understood with regard to the following description, appended claims, and accompanying drawings, which illustrate examples of the invention. However, it is to be understood that each of the features can be used in the invention in general, not merely in the context of the particular drawings, and the invention includes any combination of these features, where:

Figure 4A:
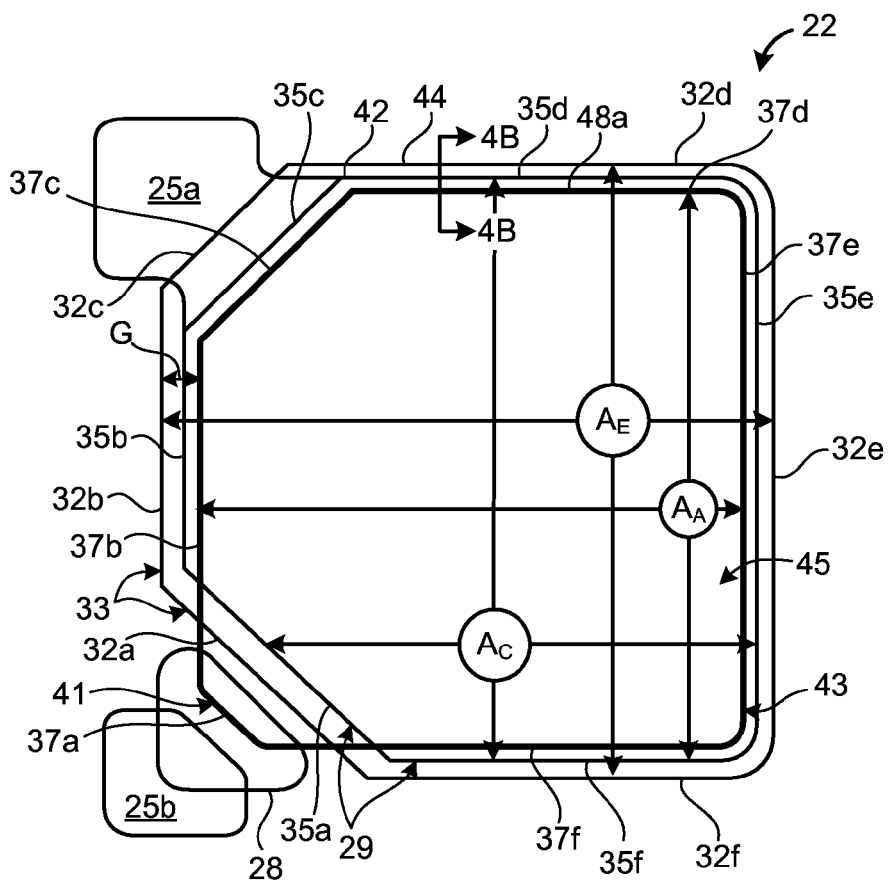
Figure 4B:
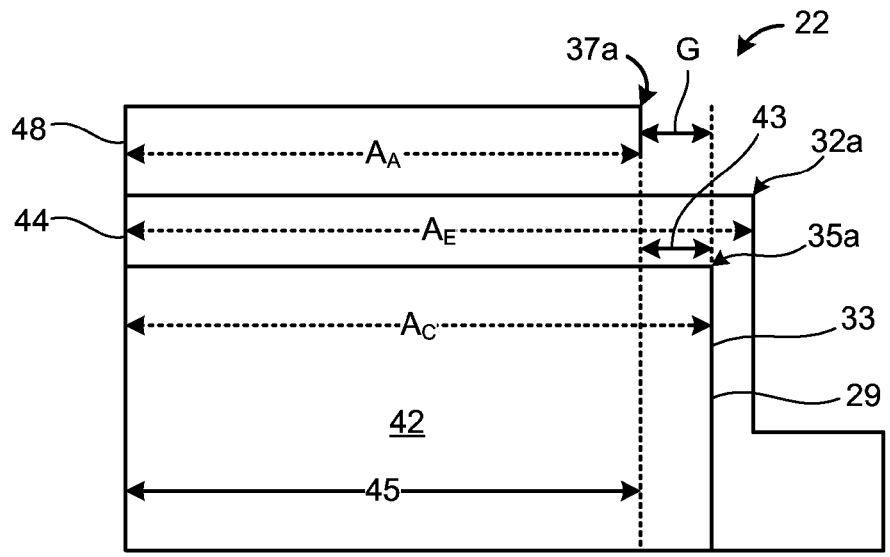
Figure 5A:
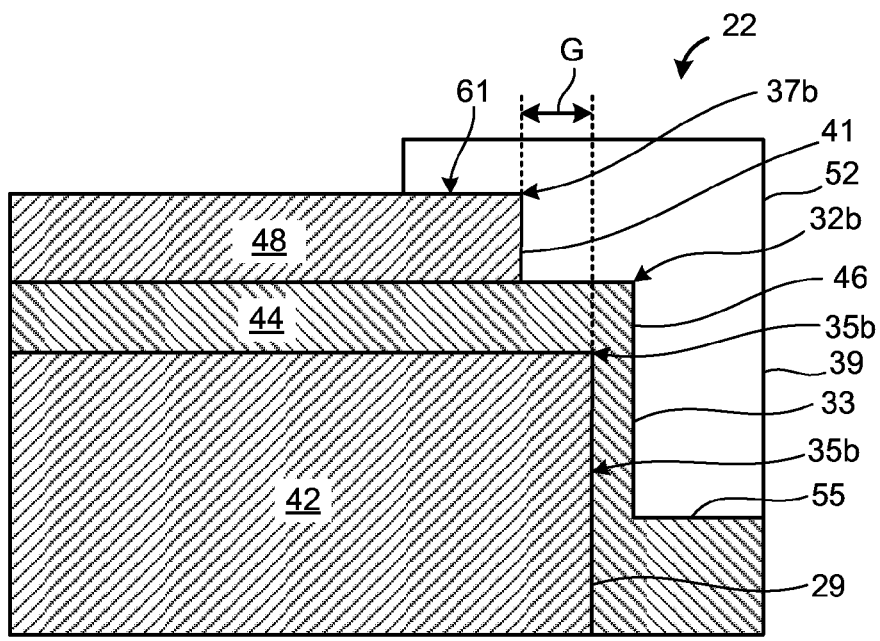
Figure 5B:
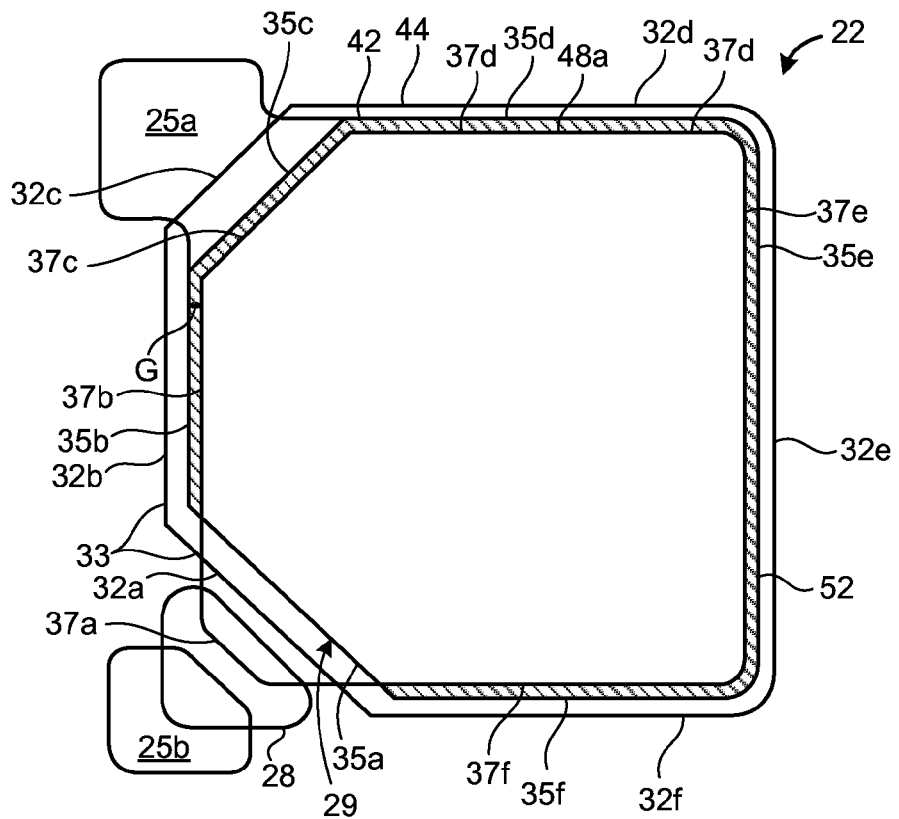
Figure 6A:
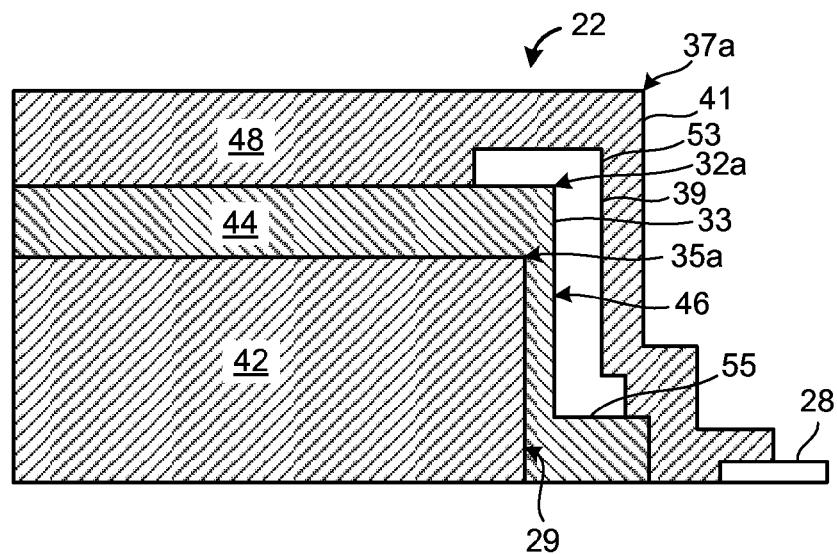
Figure 6B:
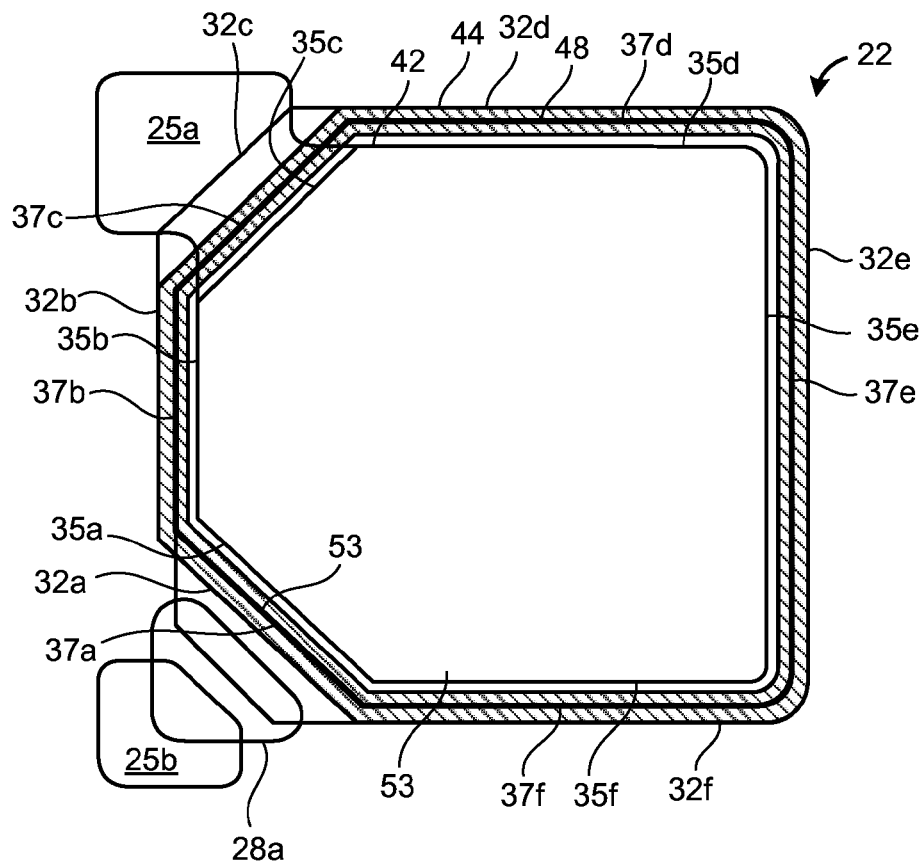
Figure 6C:
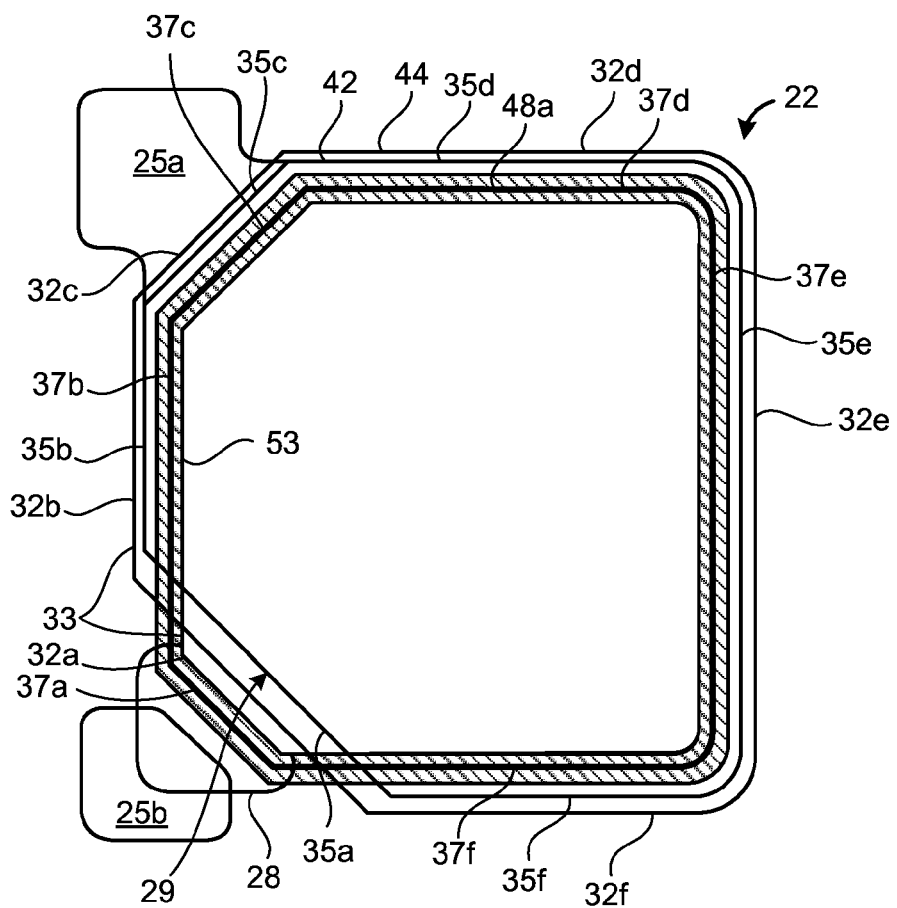
Figure 6D:
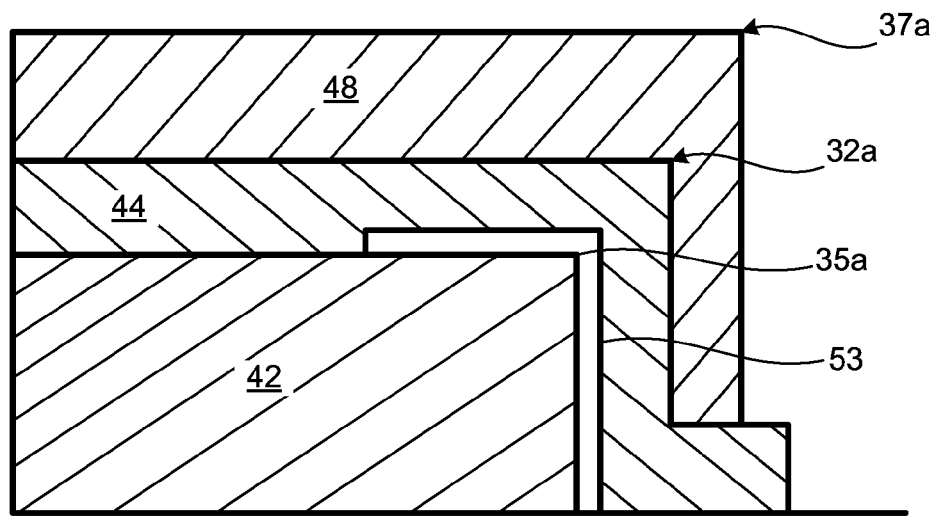
Figure 7:
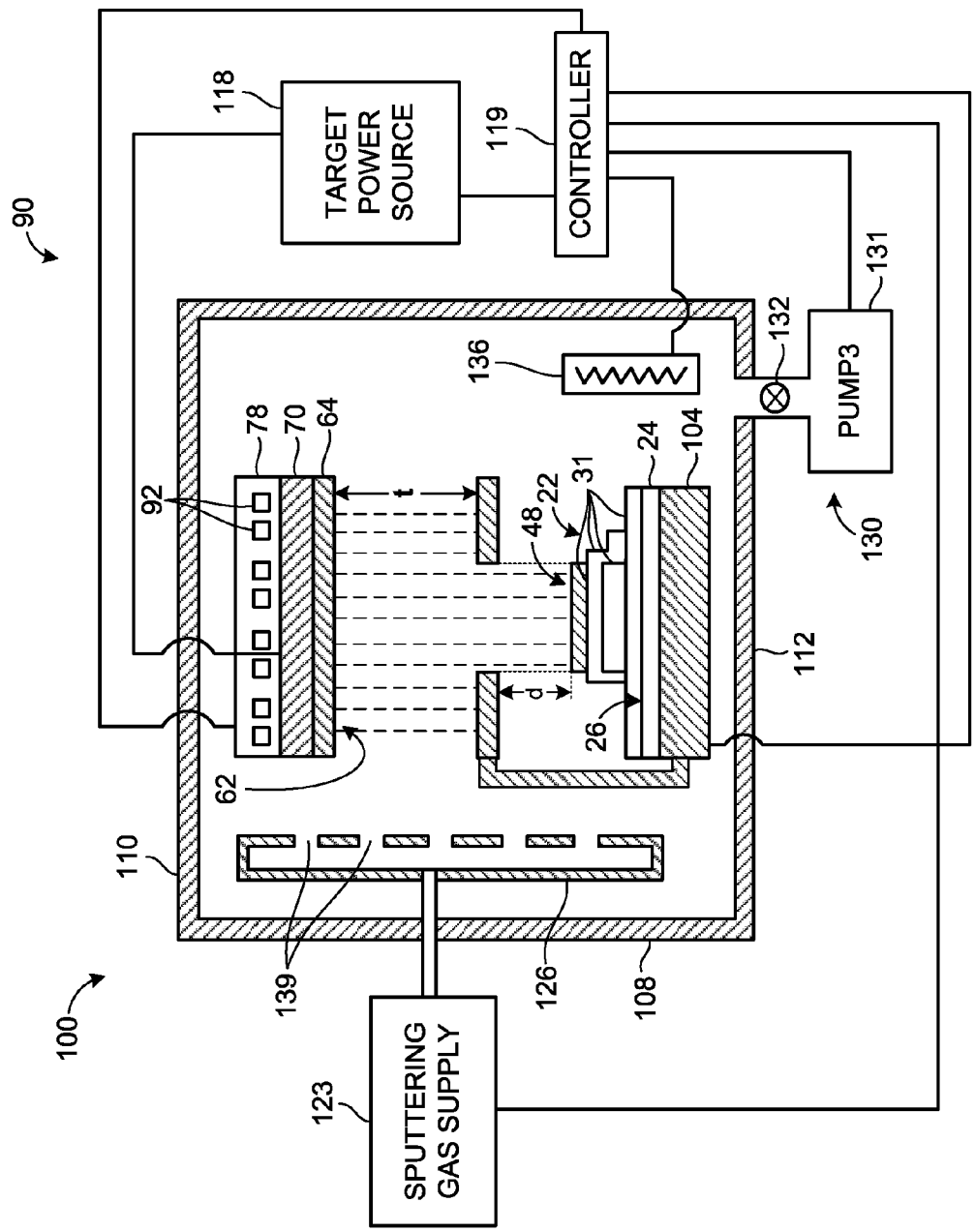

FIG. 4A a schematic top view of a partially built battery cell showing outline profiles of selected battery component layers, and showing a compressed anode having an anode area that is smaller than the cathode area, and with a plurality of anode perimeter edges that terminate before corresponding, adjacent, underlying cathode perimeter edges, and which exhibits low leakage current at these edges;

FIG. 4B is a schematic side sectional view of the battery cell of FIG. 4A along section 4B, showing the compressed anode sized with at least one anode perimeter edge terminated before its corresponding, adjacent, underlying cathode perimeter edge to define a gap therebetween;

FIG. 5A is a schematic side sectional view of a portion of a partially built battery cell showing an over-edge anode dielectric covering an anode perimeter edge of a compressed anode, the dielectric also having a dielectric sidewall that extends down to cover the electrolyte sidewall which is adjacent to the cathode sidewall and an electrolyte flange;

FIG. 5B is a schematic top view of the battery cell of FIG. 5A showing outline profiles of selected battery component layers, and showing the over-edge dielectric (hatch marks) covering all the anode perimeter edges except for the anode perimeter edge that extends over the cathode to contact the anode contact bridge;

FIG. 6A is a schematic side sectional view of a portion of a partially built battery cell showing an under-edge anode dielectric covering an electrolyte lying over a corresponding cathode perimeter edge, and having a dielectric sidewall that extends down to cover the electrolyte sidewall adjacent to the cathode sidewall and a portion of an electrolyte flange;

FIG. 6B is a schematic top view of a battery cell showing outline profiles of selected battery component layers, showing a full-size anode, and an under-edge dielectric covering an electrolyte perimeter edge lying over cathode perimeter edge, and with the anode perimeter edge extending over the cathode to connect to the anode contact bridge;

FIG. 6C is a schematic top view of the battery cell showing outline profiles of selected battery component layers, and showing a compressed anode, an under-edge dielectric covering a cathode perimeter edge, and an anode perimeter edge extending over the cathode to connect to the anode contact bridge;

FIG. 6D is a schematic side sectional view of a portion of a partially built battery cell showing an under-edge anode dielectric covering a cathode perimeter edge; and FIG. 7 is a sectional side schematic view of a sputtering chamber with a sputtering target and a mask to form an anode at a preset distance from a support carrier holding a support.

DESCRIPTION

Figure 1A:
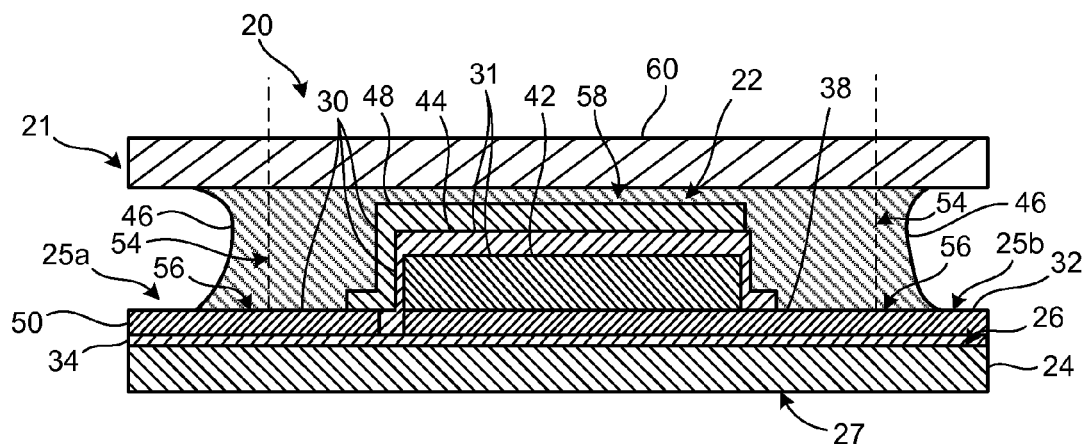
FIG. 1A is a sectional side view of an embodiment of a lithium battery comprising a battery cell on a support.
Figure 1B:
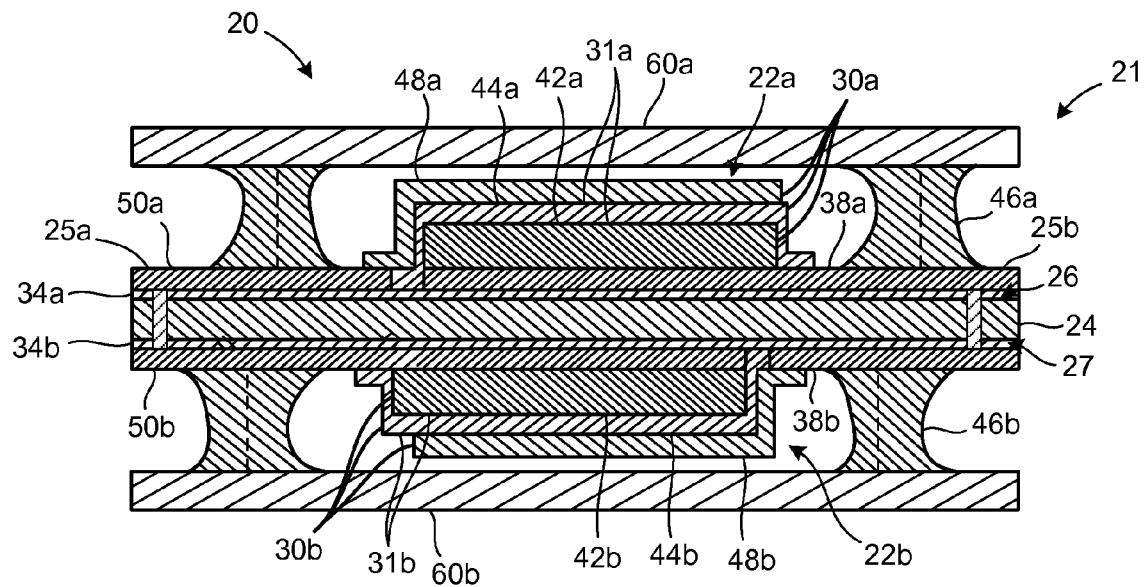
FIG. 1B is a sectional side view of another embodiment of a lithium battery comprising a first battery cell on a first surface of a support and a second battery cell on a second surface of the same support.

Exemplary embodiments of a rechargeable battery 20 having a protective casing 21 enclosing one or more battery cells 22 or 22a,b, are shown in FIGS. 1A and 1B. The protective casing 21 protects the battery cell 22 from degradation in the external environment. The support 24 comprises a material that has low permeability to oxygen, water vapor, carbon monoxide, carbon dioxide and the like. The support 24 should also have a relatively smooth surface and sufficient strength to support battery cells 22 at conventional fabrication or operational temperatures. For example, the support 24 can comprise aluminum, aluminum oxide, metal foil, metalized plastic film, mica, quartz, or steel. In one version, the support 24 comprises a first surface 26 and a second surface 27 both of which are planar, or even flat and smooth. One desirable type of support 24 comprises a crystalline sheet formed by cleaving the planes of a cleavable crystalline structure, such as mica or graphite. Terminals 25a,b extend out of the protective casing 21 of the battery 20 to connect the battery 20 to an external load or circuit. The exemplary batteries 20 provided herein illustrate the structure and features of a battery; however, these exemplary battery structures should not be used to limit the scope of the claims, and alternative battery structures that would be apparent to those of ordinary skill in the art are within the scope of the present claims.

Referring to FIG. 1A, the battery cell 22 includes battery component layers 30 that cooperate to form a battery capable of receiving, storing, and discharging electrical energy. The battery component layers 30 include one or more lithium-containing films 31. The battery component layers 30 include an adhesion layer 34 which is deposited on the first surface 26 of the battery support 24, such as, for example, a metal or metal compound, such as for example, aluminum, cobalt, titanium, other metals, or their alloys or compounds thereof; or a ceramic oxide such as, for example, lithium cobalt oxide. The battery component layers 30 also include can any one or more of a cathode current collector 38, cathode 42, anode 48, and anode current collector 50. The cathode current collector 38 and anode current collector 50 can be composed of a metal, such as for example, aluminum, platinum, silver or gold. The cathode 42 can be composed of lithium metal oxide, such as for example, lithium cobalt oxide, lithium nickel oxide, lithium manganese oxide, lithium iron oxide, or even lithium oxides comprising mixtures of transition metals such as for example, lithium cobalt nickel oxide. The anode 48 can be made from a metal such as lithium. The battery component layers 30 can have, for example, thicknesses of from about 0.1 microns to about 100 microns. The protective casing 21 can include a polymer 46 covering one or more of the side perimeter surfaces 54 that extend along the perimeter 56 of the battery 20, as well as the top surface 58 of the battery 20. The casing 21 can also include a cover 60 which covers the top surface 58 of the battery 20.

In the version shown in FIG. 1B, the battery 20 comprises a first battery cell 22a on an adhesion layer 34a deposited on the first surface 26 of the support 24 and a second battery cell 22b on an adhesion layer 34b on the second surface 27 of the support 24. The battery cells 22a,b can be connected by the connectors 29 which can extend through the support 24 (as shown) or around its perimeter, to connect to the two terminals 25a,b. While single battery cells 22a,b are illustrated, it should be understood that more than one battery cell 22a or 22b can be arranged horizontally across the top or second surfaces 26, 27, respectively, of the battery support 24. The battery cells 22a,b and additional cells (not shown) can be connected in series or parallel. Each battery cell 22a,b comprises a plurality of battery component layers 30a,b that include one or more lithium-containing layers 31. The battery component layers 30a,b can include an adhesion layer 34a,b; cathode current collector 38a,b; cathode 42,b; electrolyte 44,b; anode 48,b; and second or anode current collector 50a,b, respectively. This version of the battery 20 having two opposing cells 22a,b can be formed using the same processes used to form the battery 20 with the single cell 22 shown in FIG. 1A, by flipping over the support 24 to form the battery component layers 30b of the second battery cell 22b, during or after processing of the first battery cell 30a. Alternatively, the battery component layers 30b of the second battery cell 22b can be formed simultaneously with the battery component layers 30a of cell 22a, using a sputtering chamber having multiple sputtering targets on either side of the battery support 24. In this battery 20, the protective casing 21 includes two layers or beads of polymer 46a,b covering the two battery cells 22a,b, respectively, as well as two covers 60a,b.

Figure 2:
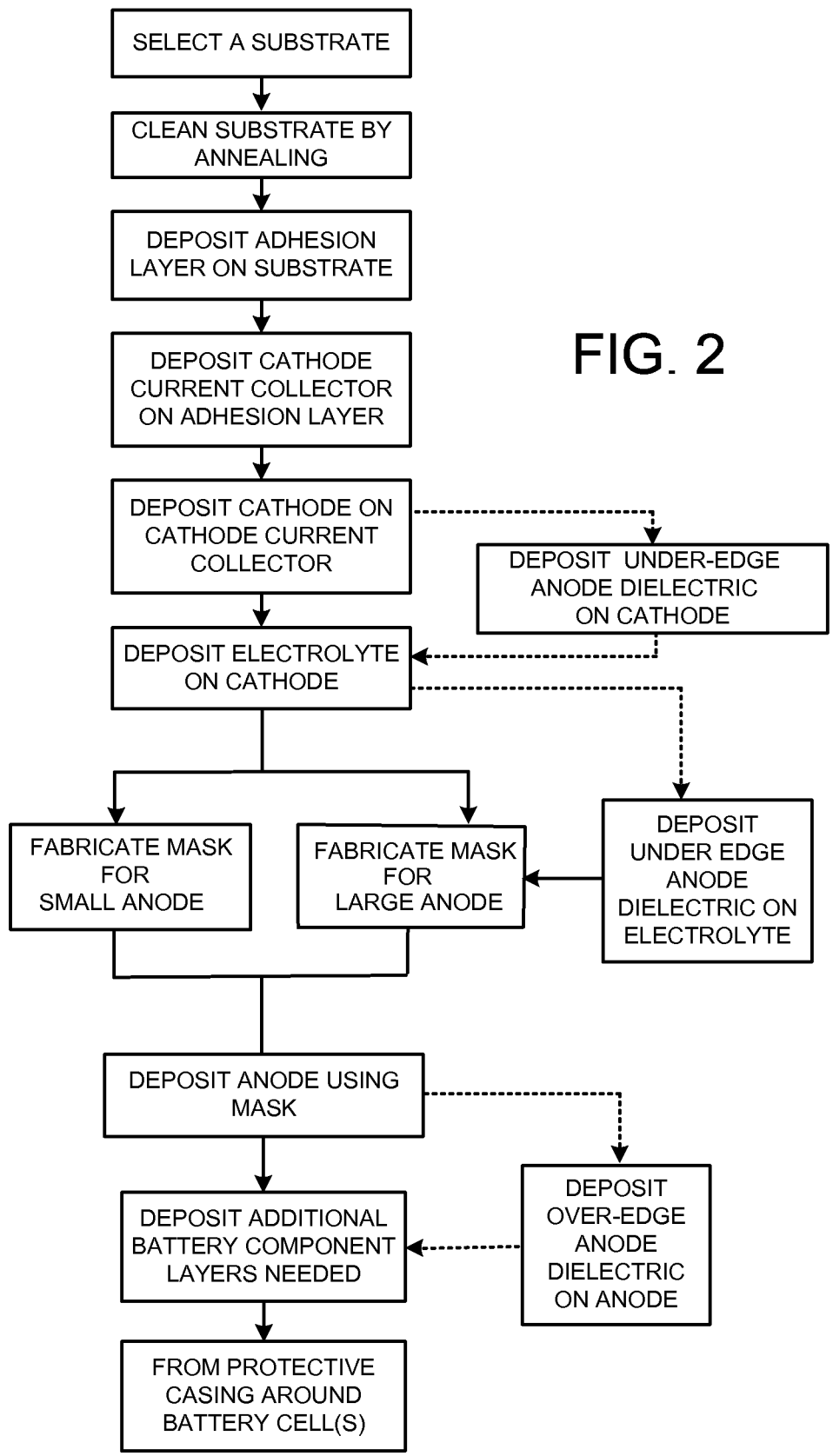
FIG. 2 is a flowchart illustrating an exemplary process of forming a battery cell.

An exemplary process of fabricating one or more battery cells 22 of a battery 20 on a top or bottom surface 26, 27, respectively, of a support 24 is illustrated with reference to FIG. 2. While exemplary embodiments of processes for fabricating a battery are described, it should be understood that other fabrication processes as would be apparent to one of ordinary skill in the art are within the scope of the present invention. For example, the fabrication process described herein can include processes of forming a battery cell 22 which are found in, for example, commonly assigned U.S. patent application Ser. No. 12/032,997, entitled "LITHIUM BATTERY FABRICATION USING LASER SHAPING" to Nieh et al., filed on Feb. 18, 2008; and U.S. Pat. Nos. 6,921,464; 6,632,563, 6,863,699, and 7,186,479; all of which are incorporated by reference herein and in their entireties.

In the fabrication process, a support 24 is selected and the top and bottom surfaces 26, 27 of the support 24 are cleaned to remove surface contaminants to obtain good adherence of subsequently deposited layers. For example, the support 24 can be cleaned by an annealing process in which the support 24 is heated to temperatures sufficiently high to clean the surface by burning-off contaminants and impurities, such as organic materials, water, dust, and other materials deposited on the surfaces 26, 27. The support 24 can also be heated to temperatures sufficiently high to remove water of crystallization present in the support material. The annealing temperatures and/or water of crystallization removal temperatures can be, for example, from about 150 to about 600° C., or even at least about 540° C. The annealing process can be conducted in an oxygen-containing gas, such as oxygen or air, or other gas environments, for about 10 to about 120 minutes, for example, about 60 minutes.

After a suitably clean surface is obtained, battery component layers 30a are deposited on the top surface 26 of the support 24 using a plurality of different processes. The deposited battery component layers 30 include terminals 25a,b that output the power generated or stored by a set of battery component layers 30. The battery component layers contain one or more lithium-containing films 31 composed of elemental lithium and lithium compounds. In a minimal configuration, a battery cell 22 comprises an electrolyte 44 that is sandwiched between at least a pair of electrodes that include (i) a cathode current collector 38 and/or cathode 42, and (ii) an anode 48 and/or anode current collector 50. The electrodes collect electrons which are released from one electrolyte surface when ions travel through the electrolyte 44, and return electrons to the other surface of the electrolyte 44. In one exemplary embodiment, the battery component layers 30 can include, for example, an adhesion layer 34, cathode current collector 38, cathode 42, electrolyte 44, anode 48, and anode current collector 50.

It should be noted that before or after fabrication of any of the battery component layers 30, the battery cell 22, battery component layers 30, or support 24, can be shaped to form shaped features by removing portions of the battery component layers 30 or support 24. The shaping processes can be performed, for example, after deposition of the cathode 42 and electrolyte 44, to shape one or both of these films, such as by etching away the edge portions 77 or forming holes for the terminals 25a,b. Suitable shaping processes include pulsed laser, etching, another such processes, and these processes can be used to form the shapes of the battery component layers 30 shown in FIGS. 1A and 1B.

The adhesion layer is deposited on the top surface 26 of the support 24 to improve adhesion of overlying battery component layers 30. The adhesion layer 34 can comprise a metal or metal compound, such as for example, aluminum, cobalt, titanium, other metals, or their alloys or compounds thereof; or a ceramic oxide such as, for example, lithium cobalt oxide. When the adhesion layer 34 is fabricated from titanium, the titanium layer is deposited in a sputtering chamber with, for example, the following process conditions: argon at a pressure of 2 mTorr; DC (direct current) sputtering plasma set at a power level of 1 kW, deposition time of 30 seconds, titanium target size of 5×20 inches, and target to support distance of 10 cm. To form batteries 20 on both sides of the support, a second adhesion layer (not shown) can be deposited on the bottom surface 27, and a second battery cell 22 built on this surface. The adhesion layer 34 is deposited to a thickness of from about 100 to about 1500 angstroms.

A cathode current collector 38 is formed on the adhesion layer 34 to collect the electrons during charge and discharge process. The cathode current collector 38 is typically a conductor and can be composed of a metal, such as aluminum, platinum, silver or gold. The current collector 38 may also comprise the same metal as the adhesion layer 34 provided in a thickness that is sufficiently high to provide the desired electrical conductivity. A suitable thickness for the current collector 38 is from about 0.05 microns to about 2 microns. In one version, the current collector 38 comprises platinum in a thickness of about 0.2 microns. The current collector 38 can be formed by deposition of platinum by DC magnetron sputtering. The sputtering conditions for depositing a platinum layer from a platinum target uses sputtering gas comprising argon at a gas pressure of 5 mTorr to form a DC plasma at a power level of 40 W for 10 minutes.

Figure 3A:
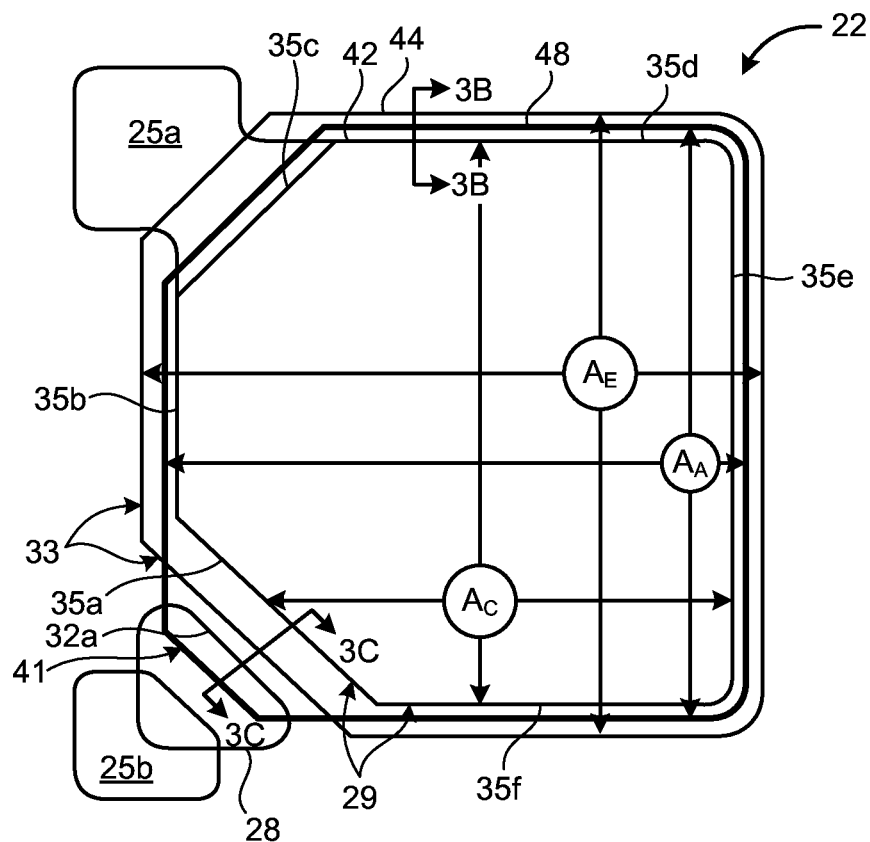
FIG. 3A is a schematic top view of a portion of a partially built battery cell, showing outline profiles of selected battery component layers, and showing a full-size anode having an outlined anode area that extends to and over the cathode perimeter edge boundaries of the cathode area at all of the cathode perimeter edges.

A cathode 42 comprising a lithium-containing material is formed over the cathode current collector 38. The cathode has a cathode area $A_c$, which is the area of the cathode that is below the electrolyte 44, as shown in FIGS. 3A to 4B. In these drawings only some of the battery component layers 30 of the battery cell 22 are shown to simplify presentation of the overlapping layers. The cathode area $A_c$ has a plurality of cathode perimeter edges 35a-f which set the outer boundaries of the electrolyte area covered by the cathode area $A_c$. Along all the cathode perimeter edges 32a-f, the cathode has a cathode sidewall 29 which is covered by the electrolyte 42 in the form of an electrolyte sidewall 33. The terminal 25 connects to the cathode 42 by being deposited over or below the cathode 42 to directly contact the cathode perimeter edge 35c, as shown in FIGS. 3A and 4A.

In one version, the cathode 42 is composed of lithium metal oxide, such as for example, lithium cobalt oxide, lithium nickel oxide, lithium manganese oxide, lithium iron oxide, or even lithium oxides comprising mixtures of transition metals such as for example, lithium cobalt nickel oxide. Other types of cathodes 42 that may be used comprise amorphous vanadium pentoxide, crystalline $V_2O_5$ or $TiS_2$. The cathode can be deposited as a single layer or as a stack of layers, with alternate deposition and annealing steps. Typically, the cathode stack has a thickness of at least about 5 microns, or even at least about 10 microns. The cathode 42 can be annealed to reduce stress in the layer at a temperature of from about 200 to about 500° C. The cathode 42 can also be annealed in a defect reducing step to temperatures from about 150 to about 700° C., for example, about 540° C., to further improve the a quality of the cathode 42 by reducing the amount of defects.

An electrolyte 44 also comprising a lithium-containing material is formed on, or even abutting and directly over, the cathode 42. The electrolyte 44 comprises an electrolyte area $A_E$ that covers and extends over the cathode area $A_c$ of the cathode 42, also as shown in FIGS. 3A to 4B. The electrolyte area $A_E$ is bounded by a plurality of electrolyte perimeter edges 32*a-f*, which extend over and covers the cathode sidewall 29 to form an electrolyte sidewall 33. The electrolyte sidewalls 33 are deposited to reduce electrical shorts between the overlying anode 48 and the cathode 42 which would occur if these regions were not covered by the electrolyte 42. The electrolyte 44 can be, for example, an amorphous lithium phosphorus oxynitride film, also known as a LiPON film. In one embodiment, the LiPON has the stoichiometric form $Li_xPO_yN_z$, in an x:y:z ratio of about 2.9:3.3:0.46. In one version, the electrolyte 44 has a thickness of from about 0.1 to about 5 microns, or even from about 2 to about 4 microns. This thickness is suitably large to provide sufficiently high ionic conductivity and suitably small to reduce ionic pathways to minimize electrical resistance and reduce stress. In the version shown, the electrolyte area is substantially the same area as the cathode area, and has a shape that corresponds to the shape and profile of the cathode area. Generally, the cathode area Ac and the overlying electrolyte area $A_E$ are planar and parallel to the support surfaces 26 or 27, but these regions can also have non-planar, vertical or convoluted profiles.

In the version shown, an anode current collector 50 is deposited about a perimeter of the electrolyte 44 and outside an electrolyte area $A_E$ of electrolyte 44 as shown in FIGS. 1A and 1B. The outside extending potion of the anode current collector 50 serves as a terminal 25*b* of the battery cell 22. However, portions of the anode current collector 50 can also be deposited on selective portions of the electrolyte 44 depending on the battery cell structure. The anode current collector 50 can be made of the same material as the cathode current collector 38 to provide a conducting surface from which electrons may be dissipated or collected from the anode 48. For example, the anode current collector 50 can be composed of a non-reactive metal such as silver, gold, platinum, in a thickness of from about 0.05 microns to about 5 microns.

The anode 48 is formed on, or even abutting and directly over, the electrolyte 44 to receive electrons released by lithium ions that migrate through the electrolyte 44. The anode 48 comprises a lithium-containing material which can be elemental lithium or a lithium compound. In one version, anode 48 is made from elemental lithium. The elemental lithium is also sufficiently conductive to serve as the anode current collector 50, so the anode 48 and anode current collector 50 can also both be made of elemental lithium. The anode 48 can also be composed of the same material as the cathode 42, as previously described. A suitable thickness of the anode 48 is from about 0.1 microns to about 20 microns. The anode 48 can also be permeable as for example described in U.S. Pat. No. 6,713,987, entitled "Rechargeable battery having permeable anode current collector", filed on Feb. 28, 2002, which is incorporated herein by reference in its entirety.

The anode 48 has an anode area $A_A$ at least partially covers the electrolyte area $A_E$ of electrolyte 44, and the area $A_c$ of the cathode 42, as shown in FIGS. 3A to 4B. The anode area $A_A$ has a plurality of anode perimeter edges 37*a-f* that sets its coverage area. Each anode perimeter edge 37*a-f* has a corresponding cathode perimeter edge 35*a-f* that lies adjacent to and below, or directly below, the anode perimeter edge 37*a-f* and under the electrolyte 44. Likewise each anode perimeter edge 37*a-f* also has a corresponding electrolyte perimeter edge 32*a-f* that lies adjacent to and below the level of each anode perimeter edge 37*a-f*. The anode area $A_A$ of the anode 48 has a surface profile which is generally conformal to the surface profile of the electrolyte 44 or even the underlying cathode 42. For example, when the electrolyte 44 is a planar region generally parallel to the surfaces 26, 27 of the support 24, the anode area $A_A$ of the anode 48 is also planar. When the electrolyte 44 has a convoluted profile having non-planar regions, the anode area $A_A$ of the anode 48 also has a convoluted profile. As another example, when the electrolyte 44 is shaped as a vertical wall, the anode area $A_A$ of the anode 48 is also a vertical wall covering abutting the vertical wall of the electrolyte 44. In versions where the anode 48 is deposited both onto the electrolyte 44 and over a portion of anode current collector 50, the anode area $A_A$ of the anode 48 is the area covering the area $A_E$ of electrolyte 44 and not the area covering the anode current collector 50.

Figure 3B:
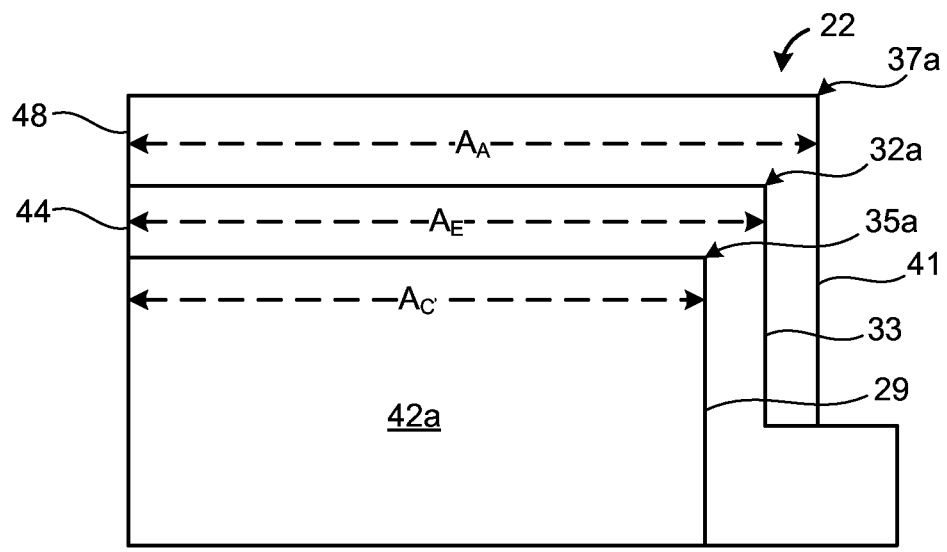
FIG. 3B is a schematic side sectional view of a battery cell showing an anode perimeter edge of a full-size or compressed anode extending over and beyond the cathode area to cover the electrolyte sidewall to allow electrical coupling of the anode to the anode contact bridge, and in which leakage currents were detected along portions of the anode sidewall.

At one electrolyte perimeter edge 32*a*, the anode 42 is deposited to extend over and cover the electrolyte sidewall 33 to form an anode sidewall 41, as shown in FIG. 3B. The anode sidewall 41 is provided to electrically connect the anode 42 to the anode contact bridge 28, which in turn is electrically connected to the terminal 25*b*. The anode sidewall 41 that extends over the electrolyte sidewall 33 is prone to electrical shorts as the electrolyte sidewall 33 does not always fully cover the underlying cathode sidewall 29. The poor coverage is often a result of the electrolyte deposition process which being a sputtering or PVD process, provides good and uniform coverage of line-of-sight regions from the sputtering target but uneven coverage of the slanted or vertical sidewall regions such as the electrolyte sidewall 33.

In a full-size anode battery cell 22, the anode 48 has a covering area $A_A$ that is sized substantially the same (±5%) or larger than the area $A_C$ of the cathode 42, is illustrated in FIGS. 3A and 3B. The full-size anode 48 is deposited to have anode perimeter edges 37*b-f* that each extend to and terminate directly above corresponding, underlying, cathode perimeter edges 35*b-f*. This ensures that the anode 48 extends over and fully covers the area of the cathode 42 to maximize charging and discharging efficiencies. It should be noted that in FIG. 3A, the anode 48 is the top layer, the electrolyte 44 in the middle, and the cathode 42 the bottom layer. The outline profile of the anode 48 in FIG. 3A at the anode perimeter edges 37*b-f* is shown to extend slightly beyond the cathode perimeter edges 35*b-f* to show both termination edges of the overlapping layers in a top view drawing; however, each of the actual anode perimeter edges 37*b-f* terminate directly above corresponding, underlying, cathode perimeter edges 35*b-f*. However, at a single edge, namely the anode perimeter edge 37*a*, as shown in FIGS. 3A and 3B, the anode 42 extends over and beyond the corresponding electrolyte perimeter edge 32*a* and underlying cathode perimeter edge 35*a* to form an anode sidewall 41 over an electrolyte sidewall 33 as previously described.

Leakage currents and electrical shorts were detected in battery cells 22 having full-size anodes 48, which could cause these batteries to fail more frequently and have lower charge capacities. It was further discovered that when the full-size anode 48 was deposited to extend to the cathode perimeter edges 35*b-f* and over the cathode perimeter edge 35*a*, the electrolyte sidewalls 33 underlying the anode area did not always fully cover the cathode 42. Small gaps and microscopic fissures occurred in the electrolyte sidewalls 33 or electrolyte perimeter edges 32*a-f*, where the deposited electrolyte material was thinner or even missing. These small gaps and fissures were believed to cause electric shorts by creating a conductive surface path directly connecting the underlying portions of the cathode 42 to the overlying anode 48. Further, fully covering the thicker cathode 42 with a layer of an electrolyte 44 is even more difficult when the cathode 42 is a thick cathode having a thickness of greater than 10 microns. The thicker cathodes 42 gave higher energy density batteries but were found to cause electrical shorts in numerous batteries significantly lowering battery fabrication yields.

In one version, a battery cell 22 comprises a compressed anode 48a having an anode area $A_A$ that is compressed and sized to have a smaller footprint with at least one anode perimeter edge 37b-f terminated before, and spaced apart from, a corresponding cathode perimeter edge 35b-f that lies adjacent to and below the selected anode perimeter edge 37b-f, as shown in FIGS. 4A and 4B. The compressed anode 48a significantly reduces leakage currents that occur from the cathode perimeter edges 35b-f to the corresponding anode perimeter edges 37b-f. In this version, any one or a plurality of the anode perimeter edges 37b-f are terminated before, and spaced apart from, their corresponding, adjacent, underlying cathode perimeter edge 35b-f to define a gap between the anode perimeter edge and corresponding cathode perimeter edge, the gap having a gap distance G. Terminating the anode 48 with a gap distance G reduces or eliminates any electrical shorting that would otherwise occur between the anode perimeter edge 37b-f and the underlying cathode perimeter edge 35b-f. The larger the number of anode perimeter edges 37b-f that are terminated to provide the gap distance G, the lower the electrical shorting problems of the resultant battery cells 22. Typically, the gap distance is uniform across the length of a particular anode perimeter edge 37b-f, but the gap distance can also change along the length to, for example, accommodate projections or other underlying or later deposited overlying structures. In one version, the gap distance G is at least 10 microns, or even at least about 25 microns, or even from about 50 to about 1000 microns. It should be noted that even with the compressed anode 48a, a single anode perimeter edge 37a still extends over its corresponding electrolyte perimeter edge 32a, and over the corresponding, underlying, cathode perimeter edge 35a, to contact an anode contact bridge 28 which is electrically coupled to the terminal 25b, as shown in FIG. 4A.

The compressed anode 48a can be deposited on the electrolyte 44 by a sputtering process in which a sputtering target 62 composed of copper, lithium or other conductive material is sputtered in a process chamber 100, as shown in FIG. 7. The anode 48 is deposited by DC sputtering of a sputtering target 62 comprising a metal-containing sputtering member 64 comprising elemental lithium or elemental copper. A process gas comprising argon is introduced into the chamber 100 via the gas distributor 126 at a flow rate of from about 50 sccm to about 500 sccm, and the chamber pressure is maintained at about 5 mTorr. A plasma is formed by applying a DC voltage at a power level of 100 W to 500 W to the sputtering target 62 to form a process gas environment in which sputtered copper species from the target 62 deposit elemental copper on the electrolyte 44 to serve as the anode 48.

In the sputtering process, a mask 59 comprising a frame 76 having an opening 77 that allows sputtered species to travel therethrough while impeding or blocking the travel of, or neutralizing sputtered species at the area occupied by the frame 76 is used. The frame 76 is composed of a metal, metal oxide, polymer or electrically insulator, such as for example, stainless steel, aluminum oxide or mica. The mask 59 has mask perimeter edges 64a-f that are set by the frame 76 and adapted to define the anode area $A_A$ of the full size anode 48 or compressed anode 48a. Thus each mask perimeter edge 64a-f corresponds to a particular anode perimeter edges 37a-f, each of which in turn has a corresponding cathode perimeter edge 35a-f that lies immediately below the anode perimeter edge 37a-f being sputtered. When sputter depositing the compressed anode 48a, the mask 59 is sized so that at least one mask perimeter edge 64b-f is positioned to generate an anode perimeter edge 37b-f on the support 24 that terminates before its corresponding cathode perimeter edge 35b-f to define a gap having a gap distance G between the anode perimeter edge 37b-f and corresponding cathode perimeter edge 35b-f. When sputter depositing the full size anode 48, the mask 59 is sized so that more than one mask perimeter edge 64a-f is positioned to generate an anode perimeter edge 37a-f that extends up to, or beyond, its corresponding cathode perimeter edge 35a-f. During the sputtering, the mask 59 is placed between the support 24 and a sputtering target 62 in a process chamber 100, and the target 62 is sputtered through the mask 59 to form the full-size anode 48 or compressed anode 48a. Further details of the process chamber 100 are described below.

The compressed anode 48a with its undersized footprint and reduced anode area $A_A$ relative to the cathode area $A_C$ and gas spaced anode perimeter edges 37b-f was found to provide battery yields which had a 2 fold number of fewer electrical shorting defect rejections for batteries 20 having a cathode 42 with a thickness that is larger than 20 microns, or even from about 10 to about 20 microns. Since the congruity of the electrolyte sidewall 33 of the electrolyte 44 along the cathode perimeters 35a-f is often compromised for thick cathode structures, terminating the anode area $A_A$ before the cathode perimeter edges 35b-f of the cathode 42 prevents the occurrence of electrical shorting pathways at these regions.

In one version, the compressed anode 48a has an anode area $A_A$ relative to the cathode area $A_C$, such that the ratio of $A_A:A_C$ is at least about 0.99:1 or even 0.8:1. Still further, the undersized anode 48 can have an anode area $A_A$ that is at least about 1% smaller than the cathode area $A_C$ of the cathode 42.

Electrical shorting was especially reduced for battery cells 22 having thick cathodes 42 using the compressed anode 48a. Thick cathodes 42 having thicknesses of at least 10 microns are especially prone to discontinuous electrolyte coverage leading to electrical shorts. For example, processing yields of battery cells 22 having compressed anodes 48a with an anode area of 2.7 cm$^2$, cathode area $A_c$ of 3 cm$^2$, and a gap at least 200 microns, were compared with battery cells 22 having full-size anodes 48 with anode areas that extended beyond the area of the cathode 42. The compressed anode battery cells 22 were found to reduce electrical shorts from the cathode 42 to the anode 48 such that 90% batteries passed the electrical short test as compared to 70% batteries passing for full-size anode batteries having cathode thicknesses of 25 microns.

Still another advantage of battery cells 22 having a compressed anode 48a is that the uncovered cathode region 43 was found to increase the battery charge capacity. The uncovered cathode region 43 is the cathode region that lies directly below the gap region G and is absent an overhead anode material, namely, the underlying cathode region that lies between the anode perimeter edges 37b-f and the corresponding cathode perimeter edges 35b-f. The uncovered cathode region 43 is not directly under the coverage area $A_A$ of the compressed anode 48a The uncovered cathode region 43 has a longer electrical pathway for the lithium ions as they have to travel from the uncovered cathode region 43 via the electrolyte 44 to the closest overlying portions of the anode 48 which are at the closest anode perimeter edge 37b-f. In contrast, the lithium ions from the covered cathode regions 45 travel directly to the directly overhead anode 48 in a relatively shorter electrical pathway. Thus lithium ions take longer to migrate from the uncovered cathode region 43 to the closest portion of the compressed anode 48a. The longer distance traveled by the uncovered lithium ions allows the uncovered cathode region 43 to retain battery charge even after most of the covered cathode region 45 is depleted. Thus while a battery cell 22a having a full-size anode 48 had a battery capacity of 1 mAh, a battery cell 22 with compressed anode 48a had a battery capacity of 1.1 mAh. In fact, the percentage of increased battery capacity for the compressed anode 48a was found to be significant higher for battery cells 22 having footprints of less than 1 cm$^2$ because the ratio of uncovered cathode area to the covered cathode area increased dramatically as cathode area shrinks. For example, a battery capacity of a battery cell 22 having a compressed anode area of less than 1 cm$^2$ and a gap G of 200 microns was found to increase by least about 5% as compared to the capacity of a battery cell having a full-size anode 48.

Yet another advantage is that a battery cell 22 having an uncovered cathode region 43 serves as protection against over-charge and discharge of the battery cell 22. The uncovered cathode region 43, being absent overlying anode, is charged and discharged slower than the region of the cathode 42 directly under the coverage area $A_A$ of the anode 48a. For example, when the battery cell 22 is over-charged, the peripheral cathode region of cathode 42 within the gap G is still in about a half charge state allowing additional charge to be accepted by the cathode 42 without overcharging of the battery cell 22. Conversely, when the battery cell 22 is discharged, the uncovered cathode region 43 retains charge as charge dissipates from this gap region much slower than the rate of charge dissipation from regions of the cathode 42 which are directly under the coverage area of the compressed anode 48a. Thus during discharge, the uncovered cathode region 43 can balance the discharged portions of the cathode 42 to bring the battery cell 22 back to a safe charge state.

While it would take additional charging time to fully recharge a battery cell 22 with a compressed anode 48a, the larger size of the cathode 42 allowed by the small footprint of the compressed anode 48a provides a larger charge and discharge battery capacity even when the entire cathode 42 is not fully charged. The uncovered cathode region 43 is below and extends beyond the perimeter of the compressed anode 48a, for example, has a width W corresponding to the gap G distance of from about 100 microns to 500 microns. To fully charge or discharge the cathode material in the cathode volume underlying the uncovered cathode region 43 (or gap G), lithium ions would need to travel in the direction parallel to the surface of the battery cell 22 for a few hundred microns. In contrast, lithium ions travel through the much lower distance of the thickness of the cathode 42, which is at least 5 to at least 10 microns for a thick cathode, to fully charge or discharge the covered cathode material 45 lying directly under the compressed anode 48a. Because the diffusion time of the lithium ions is proportional to the square of the travel distance, it requires about 100 times the charge time to fully discharge or recharge the extra cathode volume. However, this disadvantage is not critical during the practical battery usage because the larger size of the cathode 42 allowed by use of the compressed anode 48a provides a larger charge and discharge battery capacity even when the entire cathode region is not fully charged. This compensates for the lower charge levels and charge capacity of the uncovered cathode region 43 which is not directly underneath the compressed anode 48.

In still another version, low-stress cathodes having predefined nano-crystalline structures and crystalline orientations that result in their low stress properties, are used to fabricate the cathode 42. This version is useful when a higher stress levels occur in the cathode 42 due to the difference in the lithium ion concentrations between the inner, covered cathode regions 45 and the outer, uncovered cathode regions 43. The cathode material underlying the uncovered cathode region 43 has a different lithium ion concentration as compared to the inner, covered region 45 during charging and discharging cycles. This difference in lithium ion concentration induces stresses across the cathode area $A_C$ which may result in peeling or delamination of the cathode 42. A suitable low-stress cathode material is a nano-crystalline film which generates lower stress levels when there are differences or variations in the lithium ion concentration across the cathode volume.

In still another version, an over-edge anode dielectric 52 is applied to suppress the growth of the lithium dendrites and hills at these regions of a battery cell 22, as shown in FIGS. 5A and 5B. In a battery cell 22 comprising a compressed anode 48a, lithium ions accumulate at the anode perimeter edges 37b-f after longer charge and discharge cycles. Lithium ions originally in the outer, uncovered cathode region 43 attempt to travel to the center of the cathode 42 but instead are drawn toward the closest anode portion, namely, the anode perimeter edges 37b-f, and accumulate at the anode perimeter and along the anode sidewalls 41 to form a dendrites and hill-like structures of accumulated lithium. The accumulated lithium dendrites and hill structures are probably initiated from electrolyte defects, voids, contaminations and/or uniformity at and along the anode perimeter edges 37b-f. These accumulated lithium structures are undesirable as they can induce stresses on both any overlying protective casing 21 as well as the underlying electrolyte 44. The induced stresses can even be sufficiently high to cause microcracks and fissures in the electrolyte 44 at structurally weak points in the volume of the electrolyte 44, which results in current leakage paths along the split fracture faces of the microcracks in the electrolyte 44. Furthermore, the dendrites and hill structures continue to grow and propagate laterally along the electrolyte surface after each charge and discharge cycle, and in the growth process can extend to the cathode perimeter edges 35b-f. Some of the cathode perimeter edges 35b-f are sharp or peaked and have poor coverage of overlying electrolyte material causing leakage currents to be induced into the cathode material at these regions. Still further, the lithium containing dendrites and hills are generated along a boundary that is several millimeters within the anode perimeter edges 37b-f by drawing additional lithium material from the cathode 42 outside the anode perimeter edges. When these hill-like structures reach heights of tens of millimeters, they can crack the overlying electrolyte 44 or even the protective casing 21 surrounding the battery cell 22 leading to erosion of the battery component layers 30 by the external environment or current leakage pathways.

To prevent the accumulation of lithium ions and the resultant structures, an over-edge anode dielectric 52 covers, and is directly on, one or more anode perimeter edges 37b-f as shown in FIGS. 5A and 5B. The over-edge anode dielectric 52 reduces or even entirely prevents the formation of the lithium dendrites and hills between the anode 48 and underlying cathode 42. The over-edge anode dielectric 52 is deposited after fabrication of the anode 48 and optional anode current collector 50 of the battery cell 22 form a protective covering across over any one of the anode perimeter edges 37b-f. The over-edge anode dielectric 52 can also cover, and be directly on, both the first anode perimeter edge 37b and a first electrolyte perimeter edge 32b that is adjacent to and directly below the first anode perimeter edge 37b to get better coverage of any non-uniformly deposited portions of the electrolyte sidewall 46. The over-edge anode dielectric 52 can also cover a peripheral top surface 61 of the anode 48a, and also extends over and cover the exposed electrolyte sidewall 33 adjacent to the first anode perimeter edge 37b to form a dielectric sidewall 39. The dielectric sidewall 39 enhances protection along the entire electrolyte sidewall 33 that covers the cathode 42 and is prone to discontinuities that cause electrical shorts. The dielectric sidewalls 39 and electrolyte sidewalls 33 of the electrolyte 44 are those surfaces which are vertically oriented relative to the top surface of the support 24 or battery cell 22. In one version, the over-edge anode dielectric 52 is applied to terminate on and cover the electrolyte flange 55 of the electrolyte 44.

In one version, the over-edge anode dielectric 52 is applied to cover the peripheral top surface 61 of the anode 48, all of the anode perimeter edges 37b-f, and the electrolyte sidewalls 33, as shown in FIG. 5B. The first anode perimeter edge 37b terminates before the corresponding first electrolyte perimeter edge 32b that is directly adjacent to the first anode perimeter edge 37b, the second anode perimeter edge 37c terminates before the corresponding first electrolyte perimeter edge 32c, etc, corresponding to five different edges. The over-edge anode dielectric 52 can be deposited to conform to the profile of the anode perimeter edges 37b-f and anode sidewalls 41, as well as the adjacent electrolyte perimeter edges 32b-f and electrolyte sidewalls 33. It should be noted that these drawings are drawn to illustrate the boundaries of the different layers and are not to scale. For example, in FIG. 5B, when the thickness of the electrolyte 44 is on the order of 5 microns or less, the electrolyte sidewall 33 is actually very close to the cathode sidewall 29 in comparison to the millimeter sized dimensions of the areas of the cathode 42, electrolyte 44 and anode 48, which are also shown in FIG. 5B.

In another version, an under-edge anode dielectric 53 is applied underneath the anode 48 and directly on the electrolyte 44 to cover the edge and edge-adjacent portions of the electrolyte 44, as shown in FIGS. 6A to 6C. As already explained, electrical leakage currents originate from the cathode perimeter edges 35a-f and travel through the defects in the overlying electrolyte sidewall 33 to the overlying full-size anode 48. Electrical leakage currents are particularly prone to originate from the cathode perimeter edge 35a and cathode sidewall 29 which are near the anode perimeter edge 37a which extends over the cathode 42 to contact the anode contact bridge 28 in both the full-size anode 48 and the compressed anode 48a. In this region, the anode 48 has to cross over the sharp cathode perimeter edge 35a to meet the anode contact bridge 28, and as a consequence, the electrolyte sidewall 33 is particularly prone to shorting. FIG. 6A shows the under-edge anode dielectric 53 applied under the anode perimeter edge 37a to stem the flow of electrical leakage currents from the corresponding cathode perimeter edge 35a. The under-edge anode dielectric 53 covers an electrolyte perimeter edge 32a-f which lies over a corresponding cathode perimeter edge 35a-f. The under-edge anode dielectric 53 can also be applied to cover any one or all of the electrolyte perimeter edges 32a-f underneath the anode 48 to prevent electrical leakage at any of these regions, as shown in FIG. 6B. In both cases, the under-edge anode dielectric 53 can also cover any of the electrolyte sidewalls 33 which are adjacent to a cathode perimeter edge 35a-f. Still further, the under-edge anode dielectric 53 can also terminate on and cover the electrolyte flange 55 of the electrolyte 44. The under-edge anode dielectric 53 can also have a length covering the entire length of the cathode sidewall 29 and a cathode step, when these features are present, both of which are located near the anode contact bridge 28, and its width should be sufficiently large to cover the cathode step. The cathode overlapping width should not be too high otherwise the maximum active area and charge capacity of the cathode is reduced. The under-edge anode dielectric 53 is deposited in a sufficient thickness to prevent leakage paths due to poor electrolyte coverage, for example, from about 0.05 mm to 10 mm. The under-edge anode dielectric 53 is applied after deposition of the electrolyte 44 but before deposition of the anode 48.

Still further, the under-edge anode dielectric 53 it can be used with both the full-size anode 48 and compressed anode 48a because the under-edge anode dielectric 53 is applied below the anode 48 and regardless of the shape of the anode 48. In both configurations, the under-edge anode dielectric 53 is deposited to extend over one or more of the electrolyte perimeter edges 32a-f of the underlying electrolyte 44 to cover up any microcracks or fissures in the deposited electrolyte 44. The under-edge anode dielectric 53 below a full-size anode 48 is shown in FIG. 6B. In the full-size anode configuration, the under-edge anode dielectric 53 can cover some or all the underlying electrolyte perimeter edges 32a-f with the overlying full-size anode 48. The under-edge anode dielectric 53 below a compressed anode configuration is shown in FIG. 6C. In this version, the under-edge anode dielectric 53 can also cover some or all of the electrolyte perimeter edges 32a.

In still another version, the under-edge anode dielectric 53 can also be applied directly on the deposited cathode 42, to cover at least one cathode perimeter edge 35a-f, as shown in FIG. 6D. The electrolyte 44 covers the cathode 42, and also at least partially covers the under-edge anode dielectric 53. The anode 48 covers the electrolyte 44. In this version, the under-edge anode dielectric 53 is formed before deposition of the electrolyte 44 but after deposition of the cathode 42. This version of the under-edge anode dielectric 53 generally needs to be sufficiently thin to prevent or reduce stresses that would arise from a thicker layer that may cause delamination of the overlying electrolyte 44, for example, having a thickness of less than 20 microns, or even less than 5 microns, such as for example, from about 3 to about 10 microns; and a width of, for example, less than 0.2 mm.

The over-edge anode dielectric 52 and under-edge anode dielectric 53 are each composed of a dielectric material that is electrically insulating to prevent lithium ions from penetrating the material to reduce electrical shorts. The over-edge and under-edge anode dielectrics 52, 53 should also be non-reactive to, and have good adhesion to, both the anode 48 and the electrolyte 44 (FIGS. 5A to 6C), or to both the cathode 42 and electrolyte 44 (FIG. 6D), so that the sealant adheres to these materials without delamination or peeling. Thus, the over-edge and under-edge anode dielectrics 52, 53 should have good adhesion peel strength relative to the anode 48, electrolyte 44 or cathode 42. For example, there should be no peeling on visible examination in an optical microscope. As another example, conventional scotch tape can be applied to the deposited dielectric 52, 53, and if the dielectric material peels off and sticks onto the Scotch tape, then it has insufficient peel strength.

The over-edge anode dielectric 52 should also have a high Young's modulus of at least about 2 MPa to apply adequate pressure at the anode perimeter edges 37a-f to suppress growth of the lithium dendrites and hills at these regions, while still being sufficiently soft to allow the small variations in volume of the cathode 42 and anode 48 during charging and discharging cycles. In one version, the over-edge anode dielectric 52 is composed of a polymer such as epoxy, polyvinylidene chloride polymer (PVDC), polyurethane, parylene, and Surlyn™ Dupont de Nemours Company. Advantageously, PVDC polymer provides a relatively soft and conformal coating which provides better resistance to diffusion of gaseous ions through the polymer. The PVDC polymer forms a conformal coating that serves as a passivating coating to passivate the underlying battery component layers 30, especially the lithium containing films, and protect them from the external environment. The PVDC polymer can be, for example, IXAN® SGA-1 PVDC resin, available from Solvay Plastics, Belgium. The over-edge anode dielectric 52 can even be composed of the same material as a polymer sealant used as part of the protective casing 21. In one version, the over-edge dielectric 52 is provided in a thickness of less than 100 microns, for example, from about 20 to about 50 microns.

Suitable materials for the under-edge anode dielectric 53 include for example, metal oxides such as aluminum oxide and silicon dioxide, metal nitrides, and polymers. In one version, the over-edge and under-edge anode dielectrics 52, 53, respectively, are composed of a polymer such as polyvinyldichloride (PVDC), polyurethane, parylene, and epoxy. In one version, the under-edge anode dielectrics 53 is composed of polyvinylidene chloride polymer (PVDC). PVDC polymer can provide a relatively soft and conformal coating which provides better resistance to diffusion of gaseous ions through the polymer and also serve as a passivating coating to passivate the underlying battery component layers 30. A suitable PVDC polymer can be, for example, the aforementioned IXAN® SGA-1 PVDC resin. The under-edge anode dielectric 53 can be provided in a thickness of less than 100 microns, for example, from about 20 to about 50 microns. However, when the under-edge anode dielectric 53 is applied directly on the deposited cathode 42, it is generally provided in a thickness of less than 20 microns, for example, from about 3 to about 10 microns, to reduce stresses.

The over-edge and under-edge anode dielectrics 52, 53, when in polymer form can be dip-coated, spraying, with a liquid polymer dispenser, screen printing or stencil printing, onto the desired portions of a battery cell 22 using a liquid precursor, which when cured, provides the desired polymer composition. The liquid precursor can be also made by dissolving a solid polymer material into a solvent, such as PVDC dissolved in ketones, or esters. For example, in one version, PVDC resin powder is dissolved in Methyl Ethyl Ketone (MEK) in a concentration of from about 5% weight to about 50% weight, or even from about 10% weight to about 20% weight. After coating with the liquid polymer, the polymer coated battery cell is allow to dry, to evaporate any remaining solvents in the liquid polymer to form the over-edge and under-edge anode dielectrics 52, 53, respectively. The drying time depends on the solvent and ambient drying temperature but is generally about 10 minutes at room temperature. The conformal polymer can also be applied as a thin prefabricated solid polymer film which is cut to shape and applied around the battery cell 22, such as a solid polymer film of PVDC polymer. Still further, over-edge and under-edge anode dielectrics 52, 53, respectively, composed of metal oxides or metal nitrides, can be formed using conventional PVD, CVD or other plasma methods.

After fabrication of one or more battery cells 22 on a support 24, a protective casing 21 is fabricated to protect the battery cells 22 from degradation in the external environment. In one version, the protective casing 21 comprises a polymer 46, which can be the same polymer as the polymers described above or a different polymer, and generally comprises a conformal material which can fill out the gaps and uneven heights of the profile of the battery cell 22 to provide a flatter profile. The polymer 46 is applied in liquid or film form, to cover a top surface 58 and/or the side perimeter surfaces 54 of the battery cell 22, and even extending to cover the perimeter 56 of the battery 20.

Thereafter, a cap 60 which forms another portion of the protective casing 21, is positioned on top of, or spaced apart from, the polymer 46 to cover the battery cell 22, and laminated to the battery cell 22. In one version, the cap 60 is a rigid plate of a ceramic material, a metal foil, or a metal coated plastic film, or a plurality of ceramic and polymer films which are conformal to the shape of the battery. Suitable ceramic tools include aluminum oxide or diamond-like carbon (DLC), and a suitable composition of the polymer comprises polymer, epoxy, or even a thermoset or thermoplastic polymer. The cap 60 can also be made from the same material as the support 24. The cap 60 can have a thickness of less than 50 microns, for example, from about 7 to about 40 microns. After placement, a pressure is applied to press the cap 60 and the support 24 together to squeeze the polymer 46 therebetween. A suitable pressure may be 3 psi, or even from about 3 to about 60 psi, for example, about 10 psi. The laminating process can be conducted in air or in a non-reactive gas environment, such as argon or nitrogen. A vacuum can also be pulled on the partially fabricated battery 20 using a vacuum pump to remove trapped air and form a better laminate of the cap 60, polymer 46 and underlying support 24. A suitable vacuum comprises a pressure of from about 10 mTorr to about 10 Torr. While the pressure is being applied, the battery cell 22 can also be heated to cure or to soften the polymer 46, a suitable curing or softening temperature being at least 40° C., or even from about 50 to about 110° C. After curing of polymer 46, the edge portions of the polymer 46 overlying the sections of the cathode current collector 38 and anode current collector 50 that extend beyond the peripheral edge of the battery 20 are peeled off to expose underlying material that serves as the first and second terminals 25a,b, respectively.

In the next fabrication step, one or more battery cells 22 are cut out of a support 24 on which a plurality of batteries 20 or battery cells 22 are fabricated. A suitable battery cutting process for cutting out a battery 20 can include laser or mechanical cutting. Laser cutting can be performed using a pulsed laser process. In one exemplary embodiment, the laser source is a femtosecond laser comprising a diode-pumped solid-state laser with a lasing medium comprising a rod of titanium doped sapphire. In another exemplary embodiment, the pulsed laser source is be an ultraviolet laser such as an excimer or 'excited dimer' laser, which is a chemical laser that uses a combination of an inert gas, such as argon, krypton, or xenon; and a reactive gas such as fluorine or chlorine, to generate a laser beam. Other laser sources can also be used, as would be apparent to one of ordinary skill. Several exemplary laser source and cutting methods are described in co-pending U.S. patent application Ser. No. 11/796,487 to Li et al. and co-pending U.S. patent application Ser. No. 12/032,997 to Nieh et al., both of which are incorporated by reference herein and in their entireties.

The lithium-containing films 31, 31a,b that form some of the battery component films 30 of each battery cell 22, including the cathode 42, electrolyte 44, and anode 48, can be sputter deposited onto a battery support 24 by sputtering one or more sputtering targets 62 mounted in a sputtering chamber 100 of a sputtering apparatus 90, as shown in FIG. 7. The sputtering chamber 100 comprises a sidewall 108, upper wall 110 which may be a ceiling, and lower wall 112, all of which surrounds and encloses a sputtering zone 114. The chamber sidewall 108 can be electrically isolated from the upper wall 110 and the lower wall 112 and can be electrically grounded. Sputtering gas is introduced into the chamber via gas holes 139 of a gas distributor 126, which is connected to a sputtering gas supply 123 which can include compressed gas cylinders, flow meters, valves, and other flow control equipment. The sputtering gas can contain non-reacting gases that can be energized to form a plasma that ionizes and sputters material from the sputtering targets 62, and/or can also contain reactive gases that react with sputtered material from a sputtering target 62 to form compounds that deposit on the support 24. The chamber 100 can be evacuated to a preset pressure by a gas exhaust 130 comprising one or more vacuum pumps 131 and a throttle valve 132.

A sputtering target 62 comprising a backing support 70 supporting a lithium-containing sputtering member 64 is fastened in the sputtering chamber 100 opposing and facing a support carrier 104. The sputtering target 62 is positioned abutting a magnetron 78, which generates a magnetic field about the surface of the sputtering target 62 to provide a more uniform and continuous bombardment of the target 62 with sputtering plasma ions during the sputtering process. The magnetron 78 contains one or more magnets 92, and can be internally mounted inside the chamber 100 or externally mounted. A target power source 118 comprising one or more power supplies provides an AC voltage at a voltage level of from about 200V and about 1200V, or even from about 250V to about 450V. The voltage can be provided at a power level of from about 1 kW and about 20 kW, or even from about 3 KW to about 10 KW. The voltage can also be provided at a mid-frequency level of from about 10 to about 100 kHz, or even at a frequency of from about 20 kHz to about 80 kHz.

The sputtering target 62 comprises a lithium-containing sputtering member 64 to deposit a lithium-containing film 31 such as the anode 48 onto a battery support 24 positioned on a support carrier 104. The sputtering member 64 can be rectangular, circular or cylindrical in shape, depending on the shape or configuration of the chamber 100 or battery support 24. For example, the lithium-containing sputtering member 64 can be composed of a lithium compound, such as lithium, lithium oxide, lithium cobalt oxide, or other lithium compounds. The lithium-containing material is selected to obtain the desired composition of a lithium-containing film 31. For example, a cathode 42 of a battery cell 22 can deposited using a lithium-containing sputtering member 64 composed of lithium cobalt oxide having the stoichiometric formula $LiCoO_2$. As another example, an electrolyte 44 of a battery cell 22 can deposited using a lithium-containing sputtering member 64 composed of lithium, lithium oxide or lithium phosphate. As still another example, an anode 48 of a battery cell 22 can be deposited using a lithium-containing sputtering member 64 composed of lithium.

A support carrier 104 is transported into the sputtering chamber 100 and positioned facing the sputtering target 62 inside the chamber 100. The support carrier 104 is capable of holding one or more supports 24 so that at least one surface 26 of a single or plurality of supports 24, or both surfaces 26, 27 of one or more supports 24, are exposed to the sputtering zone 114. For example, the support carrier 104 can be a rotating carousel or mechanical conveyor. The support carrier 104 is typically fabricated from plates of a metal such as copper or stainless steel.

In a sputtering process, the sputtering chamber 100 is controlled by a controller 119 that comprises program code to operate and control the various components of the chamber 100 to deposit battery component films 30 on a plurality of battery supports 24 in the chamber 100. The controller 119 comprises, for example, a general purpose computer or control electronic box, which has program code to control the gas supply 123, gas distributor 126, exhaust 130 and throttle valve 132, target power source 118 to apply a power to the sputtering target 62 or magnetron 78, and other chamber components. For example, the chamber 100 can be evacuated to a preset pressure by the gas exhaust 130 to a pressure of less than about $10 \times 10^{-5}$ Torr, prior to introduction of any cleaning or sputtering gas. Thereafter, controlled amounts of cleaning or sputtering gas are introduced into the chamber 100 via the gas distributor 126. For example, a cleaning plasma of an inert gas such as argon can also be used to clean residues from the sputtering target 62 and inner surfaces of the chamber 100.

A mask 59 is positioned a preset mask separation distance "d" away from the support carrier 104 so that the exposed surface 26 of the support 24 is spaced apart a predetermined distance from the mask 59. The mask separation distance "d" between the mask 59 and the underlying support carrier 104 is calculated to provide a set distance between the deposition surface of the support 24 and the mask 59. The distance d is important to achieve the desired degree of neutralization, or passage of, particular sputtered species. If the support separation distance is too high then overspread of the deposited layer occurs; and conversely, if the support separation distance is zero (mask touches the battery support 24) then the edge of the deposited layer might be damaged while lifting the mask off the support. A suitable support separation distance d has been found to be at least about 0.5 cm, or even at least about 1 cm; and less than about 5 cm, or even less than about 2 cm. The target separation distance "t" from the mask 59 to the exposed surface of the sputtering target 62 is also important. The target separation distance should be sufficient large that the mask 59 does not interfere with the formation, or sustainability, of the sputtering plasma. If the mask 59 is placed too close to the sputtering target 62, the mask can prevent ignition of the plasma and/or creating arcing or a fluctuating plasma. A suitable target separation distance has been found to be at least about 4 cm, or even at least about 5 cm.

The mask 59 can be attached to the support carrier 104 in a spaced apart relationship to provide the correct distance away from the exposed surface 26 of the support 24 and target 62, and also allow adjusting the distance to compensate for supports 24 having different thicknesses. In another version, the mask 59 is attached to any one or more of the sidewall 108, upper wall 110, or lower wall 112, of the chamber 100. In either case, the mask 59 can be supported by a frame 174 which extends across a portion, or the entire perimeter, of the mask 59. The frame 174 can be extendible and directly attached to the support carrier 104 or chamber wall by supports 178 that extend out of the screen. During a sputtering process, the mask 59 is maintained at a floating potential, electrically ground, or a positive or negative bias. The mask 59 can also be maintained at a floating potential or electrically grounded relative to the sputtering targets 62.

While illustrative embodiments of the battery 20 are described in the present application, it should be understood that other embodiments are also possible. The exemplary anode and battery cell structures described herein are provided only to illustrate the present invention, and other structures can be used as would be apparent to those of ordinary skill in the art. Furthermore, the battery components films 30 and fabrication processes are also exemplary and may comprise other materials. Also, each battery 20 may contain a plurality of battery cells 22 connected in series or parallel and arranged depending on the application. Thus the scope of the claims should not be limited by the exemplary methods of manufacture, materials and structures provided herein.

What is claimed is:

1. A lithium battery comprising:
   (a) a support;
   (b) a plurality of battery component layers on the support, the battery component layers including a cathode having a cathode area with a plurality of cathode perimeter edges;
   (c) an electrolyte abutting the cathode;
   (d) an anode abutting the electrolyte, the anode having an anode area bounded by anode perimeter edges, each anode perimeter edge having a corresponding cathode perimeter edge, and at least one anode perimeter edge being terminated before its corresponding cathode perimeter edge to define a gap between the anode perimeter edge and the corresponding cathode perimeter edge, the gap having a gap distance G; and
   (e) an under-edge anode dielectric underneath an anode perimeter edge, the under-edge anode dielectric directly on, and covering, an electrolyte perimeter edge.

2. A battery according to claim 1 wherein a plurality of the anode perimeter edges are terminated before each of their corresponding cathode perimeter edges.

3. A battery according to claim 1 wherein G is at least 10 microns.

4. A battery according to claim 1 wherein G is from about 50 to about 1000 microns.

5. A battery according to claim 2 further comprising an anode perimeter edge that extends over its corresponding cathode perimeter edge to electrically couple to an anode contact bridge.

6. A battery according to claim 1 wherein the anode comprises a lithium-containing material.

7. A battery according to claim 6 wherein the lithium-containing material comprises elemental lithium.

8. A battery according to claim 1 wherein the anode comprises elemental copper.

9. A battery according to claim 1 wherein the anode comprises at least one of the following:
   (i) a thickness of from about 0.1 microns to about 20 microns;
   (ii) an anode area $A_A$ relative to a cathode area $A_C$, such that the ratio of $A_A:A_C$ is at least about 0.99:1;
   (iii) an anode area $A_A$ that is at least about 1% smaller than a cathode area $A_C$; and
   (iv) an area of less than 1 cm$^2$.

10. A battery according to claim 1 wherein the cathode comprises a lithium metal oxide.

11. A battery according to claim 1 comprising an over-edge anode dielectric covering, and directly on, an electrolyte perimeter edge that is adjacent to an anode perimeter edge.

12. A lithium battery comprising:
    (a) a support;
    (b) a plurality of battery component layers on the support, the battery component layers including a cathode (i) comprising lithium metal oxide, and (ii) having a cathode area with a plurality of cathode perimeter edges;
    (c) an electrolyte abutting the cathode, the electrolyte comprising lithium containing material; and
    (d) an anode abutting the electrolyte, the anode having a plurality of anode perimeter edges that each have a corresponding cathode perimeter edge, with a first anode perimeter edge extending over its corresponding cathode perimeter edge to electrically couple to an anode contact bridge, and second anode perimeter edges terminating before their corresponding cathode perimeter edges to define a gap therebetween.

13. A battery according to claim 12 wherein the second anode perimeter edges are spaced apart from their corresponding cathode perimeter edges by a gap distance G.

14. A battery according to claim 13 wherein G is at least 10 microns.

15. A battery according to claim 1 wherein the under-edge anode dielectric further covers a plurality of the electrolyte perimeter edges underneath the anode.

16. A battery according to claim 1 wherein the under-edge anode dielectric further covers an electrolyte sidewall.

17. A battery according to claim 1 wherein the under-edge anode dielectric comprises a metal oxide, metal nitride, or polymer.

18. A battery according to claim 1 wherein the under-edge anode dielectric comprises polyvinyldichloride (PVDC), polyurethane, parylene, or epoxy.

* * * * *